United States Patent
Stoica et al.

(10) Patent No.: US 11,838,225 B2
(45) Date of Patent: Dec. 5, 2023

(54) PRECODING WIRELESS COMMUNICATIONS

(71) Applicant: Lenovo (Singapore) Pte. Ltd., New Tech Park (SG)

(72) Inventors: Razvan-Andrei Stoica, Essen (DE); Seyedomid Taghizadeh Motlagh, Oberursel (DE); Vijay Nangia, Woodridge, IL (US); Ali Ramadan Ali, Darmstadt (DE)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 18/120,948

(22) Filed: Mar. 13, 2023

(65) Prior Publication Data

US 2023/0216622 A1 Jul. 6, 2023

Related U.S. Application Data

(63) Continuation of application No. 17/508,264, filed on Oct. 22, 2021, now Pat. No. 11,616,611.

(51) Int. Cl.
*H04L 5/00* (2006.01)
*H04L 27/26* (2006.01)
*H04B 7/0456* (2017.01)

(52) U.S. Cl.
CPC ......... *H04L 5/0016* (2013.01); *H04B 7/0456* (2013.01); *H04L 5/0023* (2013.01); *H04L 27/2639* (2013.01)

(58) Field of Classification Search
CPC . H04L 5/0016; H04L 5/0023; H04L 27/2639; H04B 7/0456; H04B 7/0478
See application file for complete search history.

(56) References Cited

U.S. PATENT DOCUMENTS

| | | |
|---|---|---|
| 7,224,744 B2 | 5/2007 | Giannakis et al. |
| 8,085,819 B2 | 12/2011 | Kiran et al. |
| 8,121,235 B1 | 2/2012 | Sun et al. |
| 8,264,946 B2 | 9/2012 | Narasimha et al. |
| 9,294,175 B2 | 3/2016 | Noh et al. |

(Continued)

FOREIGN PATENT DOCUMENTS

WO 2017096121 A1 6/2017

OTHER PUBLICATIONS

B.G. Bodmann et al., "A Quantitative Notion of Redundancy for Finite Frames", arXiv:0910.5904v2, Nov. 19, 2009, pp. 1-19.

(Continued)

*Primary Examiner* — Khanh C Tran
(74) *Attorney, Agent, or Firm* — Kunzler Bean & Adamson

(57) ABSTRACT

Apparatuses, methods, and systems are disclosed for precoding wireless communications. An apparatus includes a processor and a memory coupled with the processor. The memory includes instructions that are executable by the processor to cause the apparatus to precode a set of symbols over a set of resources using a transform precoder that constrains a search space of codewords to a unit hypersphere such that the transform precoder comprises a spherical codebook having an angular threshold distance between codewords and to combine the precoded symbols in a redundant manner such that multiple parts of precoded symbols are used to protect against loss of the set of symbols.

20 Claims, 11 Drawing Sheets

(56) References Cited

U.S. PATENT DOCUMENTS

| | | |
|---|---|---|
| 9,439,187 B2 | 9/2016 | Gresset et al. |
| 9,680,578 B2 | 6/2017 | Hwang et al. |
| 9,847,897 B1 | 12/2017 | Cheng et al. |
| 9,942,013 B2 | 4/2018 | Malladi et al. |
| 10,003,489 B2 | 6/2018 | Zheng et al. |
| 10,051,634 B2 | 8/2018 | Soriaga et al. |
| 10,193,715 B2 | 1/2019 | Hasegawa |
| 2008/0108310 A1* | 5/2008 | Tong ............... H04L 5/0028 455/69 |
| 2008/0152003 A1 | 6/2008 | Oguz |
| 2010/0039928 A1 | 2/2010 | Noh et al. |
| 2010/0054354 A1* | 3/2010 | Tosato ............ H03M 7/3082 708/203 |
| 2012/0219091 A1 | 8/2012 | Li et al. |
| 2013/0039447 A1 | 2/2013 | Lee et al. |
| 2016/0191174 A1 | 6/2016 | Hwang et al. |
| 2018/0213591 A1 | 7/2018 | Kowalski et al. |
| 2019/0222275 A1* | 7/2019 | Mo ................. H04B 7/0482 |
| 2020/0235791 A1* | 7/2020 | Raghavan ......... H04B 7/0456 |
| 2021/0274527 A1 | 9/2021 | Nakamura et al. |
| 2021/0360632 A1 | 11/2021 | Yang et al. |
| 2022/0159684 A1* | 5/2022 | Mo ................. H04B 7/0482 |
| 2023/0132338 A1* | 4/2023 | Stoica .............. H04B 7/0617 375/267 |

OTHER PUBLICATIONS

S.M.Alamouti, "A Simple Transmit Diversity Technique for Wireless Communications", IEEE Journal on Select Areas in Communications, vol. 16, No. 8, October 1008, pp. 1451-1458.

Razvan-Andrei Stoica, "Frame-theoretic Designs for Future Wireless Communications", Jacobs University, Department of Computer Science & Electrical Engineering, Sep. 3, 2019, pp. 1-226.

T. Strohmer et al., "Grassmannian frames with applications to coding and communication", Applied and Computational Harmonic Analysis, vol. 14, Mar. 2003, pp. 257-275.

J.H. Conway, "Packing Lines, Planes, etc .: Packings in Grassmannian Spaces", Experimental Mathematics, vol. 5, No. 2, 1996, pp. 139-159.

3GPP, "3rd Generation Partnership Project; Technical Specification Group Radio Access Network; NR; Physical channels and modulation (Release 16)", 3GPP TS 38.211 V16.6.0, Jun. 2021, pp. 1-134.

Kaleem et al., "System-Level Performance Evaluation of the SVD based Codebooks in 3GPP LTE HetNet", IEEE, 2014, pp. 1-2.

I. Darwazeh et al., "A Spectrally Efficient Frequency Division Multiplexing Based Communications System", ResearchGate Conference Paper, https://www.researchgate.net/publication/309373002, Sep. 2003, pp. 1-7.

ETSI, "Intelligent Transport Systems (ITS); Vehicular Communications; Basic Set of Applications; Part 2: Specification of Cooperative Awareness Basic Service", ETSI EN 302 637-2, V1.3.1, Sep. 2014, pp. 1-44.

3GPP, "3rd Generation Partnership Project; Technical Specification Group Radio Access Network; NR; Physical layer procedures for data (Release 16)", 3GPP TS 38.214 V16.6.0, Jun. 2021, pages.

Mediatek Inc., "Summary of RAN1 Agreements for Rel-14 DL MUST", 3GPP TSG RAN WG1 Meeting #87 R1-1613802, Nov. 14-18, 2016, pp. 1-5.

Zte, "Key processing modules at transmitter side for NOMA", 3GPP TSG RAN WG1 Meeting #93 R1-1805840, May 21-May 25, 2018, pp. 1-11.

Qualcomm Incorporated, "Transmitter Side Signal Processing Schemes for NOMA", 3GPP TSG RAN WG1 Meeting #94 R1-1809434, Aug. 20-24, 2018, pp. 1-11.

A. Chorti, "Rate Analysis and Deep Neural Network Detectors for SEFDM FTN Systems", arXiv:2103.02306v1, Mar. 3, 2021, pp. 1-5.

H. Iimori, "Robust Symbol Detection in Large-Scale Overloaded NOMA Systems", IEEE Open Journal of the Communications Society, Mar. 9, 2021, pp. 512-533.

Huawei, Hisilicon, Revised WID: Physical Layer Enhancements for NR Ultra-Reliable and Low Latency Communication (URLLC), 3GPP TSG RAN Meeting #84 RP-191584xxxx, Jun. 3-6, 2019, pp. 1-5.

T. Xu et al., "Spectrally Efficient FDM: Spectrum Saving Technique for 5G?", 1st International Conference on 5G for Ubiquitous Connectivity, Feb. 12, 2015, pp. 1-6.

3GPP, "3rd Generation Partnership Project; Technical Specification Group Radio Access Network; Study on Downlink Multiuser Superposition Transmission (MUST) for LTE (Release 13)", 3GPP TR 36.859 V13.0.0, Dec. 2015, pp. 1-48.

3GPP, "3rd Generation Partnership Project; Technical Specification Group Radio Access Network; Study on New Radio (NR) access technology (Release 16)", 3GPP TR 38.912 V16.0.0, Jul. 2020.

3GPP, "3rd Generation Partnership Project; Technical Specification Group Radio Access Network; Study on Non-Orthogonal Multiple Access (NOMA) for NR (Release 16)", 3GPP TR 38.812 V16.0.0, Dec. 2018, pp. 1-134.

* cited by examiner

PRECODING WIRELESS COMMUNICATIONS

CROSS-REFERENCE TO RELATED APPLICATIONS

This is a continuation application of and claims priority to U.S. patent application Ser. No. 17/508,264 entitled "PRECODING WIRELESS COMMUNICATIONS" and filed on Oct. 22, 2021, for Razvan-Andrei Stoica et al., which is incorporated herein by reference.

FIELD

The subject matter disclosed herein relates generally to wireless communications and more particularly relates to precoding wireless communications.

BACKGROUND

In wireless networks, cellular communications systems are expected to truly achieve universal coverage over underwater, terrestrial, visible light and extra-terrestrial media as a unifying "network of networks." The challenges associated with such coverage goals are high and the enhancements of 5G NR towards 6G should provide the effective physical layer methods, tools, and implementation blocks to do so.

BRIEF SUMMARY

Disclosed are procedures for precoding wireless communications. Said procedures may be implemented by apparatus, systems, methods, and/or computer program products.

In one embodiment, a transmitter node apparatus includes a processor that determines a transform precoder. In one embodiment, the processor precodes a plurality of source information symbols over a set of available physical transmission resources using the determined transform precoder. In one embodiment, the processor combines the precoded source information symbols using a redundant representation.

In one embodiment, a method of a transmitter node includes determining a transform precoder. In one embodiment, the method includes precoding a plurality of source information symbols over a set of available physical transmission resources using the determined transform precoder. In one embodiment, the method includes combining the precoded source information symbols using a redundant representation.

In one embodiment, a receiver node apparatus includes a transceiver that receives an indication of a determined transform precoder from a transmitter node and a set of available physical transmission resources, the physical transmission resources comprising a set of source information symbols that are redundantly combined using the determined transform precoder. In one embodiment, the apparatus includes a processor that uses the determined transform precoder and the set of available physical transmission resources for transmissions between the receiver node and the transmitter node.

In one embodiment, a method of a receiver node includes receiving an indication of a determined transform precoder from a transmitter node and a set of available physical transmission resources, the physical transmission resources comprising a set of source information symbols that are redundantly combined using the determined transform precoder. In one embodiment, the method includes using the determined transform precoder and the set of available physical transmission resources for transmissions between the receiver node and the transmitter node.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
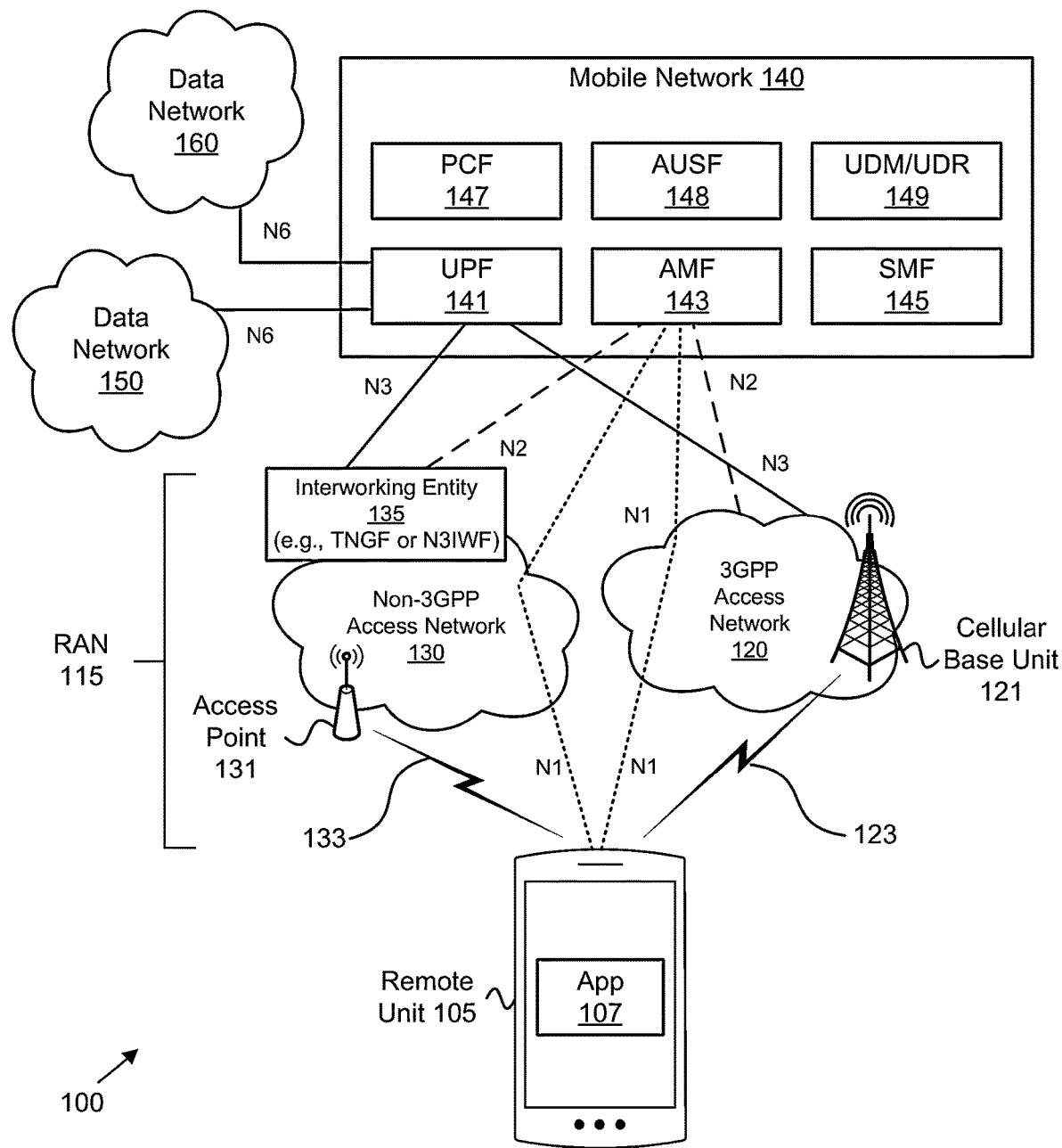
FIG. 1 is a schematic block diagram illustrating one embodiment of a wireless communication system for precoding wireless communications.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/ acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for precoding wireless communications. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

For 6G research and development, cellular communications systems are expected to truly achieve universal coverage over underwater, terrestrial, visible light and extraterrestrial media as a unifying "network of networks." The challenges associated with such coverage goals are high and the enhancements of 5G New Radio ("NR") towards 6G should provide the effective physical layer methods, tools, and implementation blocks to do so.

Orthogonal Frequency-Division Multiplexing ("OFDM") has established itself as one of the main pillars of modern-day wireless communications given its high spectral efficiency, ease of implementation at the hardware level and simplified frequency domain processing backed by simple time-domain cyclic prefix extensions for interference-free symbol and carrier-level transmissions. Albeit the fact that many candidate waveforms have been studied for 5G NR (e.g., Ahmadi, S. (2019). 5G NR: Architecture, technology, implementation, and operation of 3GPP new radio standards. Academic Press), their prevalence has failed to meet consensus and as such OFDM remained the preferred choice (e.g., TS 38.211). However, upon the nature of OFDM, it exhibits also non-ideal characteristics such as high peak-to-average power ratio ("PAPR") and sensitivity to channel selectivity in frequency-domain. To alleviate the former, various schemes exist, but the most popular one, adopted into the 5G NR specification as well, is the Discrete Fourier Transform-spread OFDM ("DFT-s-OFDM") where a time-domain DFT precoder is applied to reduce the PAPR and effectively transform the OFDM into a single-carrier frequency division multiplexing ("SC-FDM") variant.

A more stringent problem, however, given the prospects of future systems is the one of frequency selectivity. Currently, schemes employed to combat such media effects rely on feedback to exploit the knowledge of the channel and work around its imperfections. This imposes requirements on channel state information ("CSI") monitoring with feedback at a certain level of accuracy for good performance realizations. It is therefore of high interest and need to research and propose robust methods for channel selective transmissions, to alleviate these requirements and to support more diverse propagation media, mixing multipath effects with high mobility and selective material/medium absorption.

In one embodiment, the subject matter disclosed herein describes a practical, and robust redundant precoding generally applicable to various channel-selectivity domains for any point-to-point links (in either uplink ("UL"), downlink ("DL"), or sidelink ("SL") configurations) based on complex-valued redundant representations as spherical codes. In one embodiment, disclosed is a redundant precoding method and its associated apparatus of transmission-reception against frequency-selective channels in OFDM systems based upon the transform precoding with the conjugate transposed of an optimized spherical code S(M, N, t) which can tolerate up to any $$\frac{\sqrt{M(N-1)(N-M)}}{N}+1$$

deep fades at the cost of N−M redundant symbols.

In further embodiments, the subject matter disclosed herein describes an efficient harmonic realization of the robust precoding detailed above and various extensions thereof. In one embodiment, this disclosure also describes various signaling configurations. In one embodiment, disclosed is an associated precoder configuration and mapping of the redundant symbols in either contiguous or non-contiguous spectrum resource blocks/parts and signaling of precoder information as part of data channel Demodulation Reference Signal ("DM-RS") or generic control channel information signal xCI.

FIG. 1 depicts a wireless communication system 100 for precoding wireless communications, according to embodiments of the disclosure. In one embodiment, the wireless communication system 100 includes at least one remote unit 105, a Fifth-Generation Radio Access Network ("5G-RAN") 115, and a mobile core network 140. The 5G-RAN 115 and the mobile core network 140 form a mobile communication network. The 5G-RAN 115 may be composed of a Third Generation Partnership Project ("3GPP") access network 120 containing at least one cellular base unit 121 and/or a non-3GPP access network 130 containing at least one access point 131. The remote unit 105 communicates with the 3GPP access network 120 using 3GPP communication links 123 and/or communicates with the non-3GPP access network 130 using non-3GPP communication links 133. Even though a specific number of remote units 105, 3GPP access networks 120, cellular base units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one implementation, the RAN 120 is compliant with the 5G system specified in the 3GPP specifications. For example, the RAN 120 may be a NextGen RAN ("NG-RAN"), implementing NR Radio Access Technology ("RAT") and/or Long Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the User Equipments ("UEs"), subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the cellular base units 121 in the 3GPP access network 120 via UL and DL communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with a remote host (e.g., in the data network 150 or in the data network 160) via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the 5G-RAN 115 (i.e., via the 3GPP access network 120 and/or non-3GPP network 130). The mobile core network 140 then relays traffic between the remote unit 105 and the remote host using the PDU session. The PDU session represents a logical connection between the remote unit 105 and a User Plane Function ("UPF") 141.

In order to establish the PDU session (or Packet Data Network ("PDN") connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. Additionally—or alternatively—the remote unit 105 may have at least one PDU session for communicating with the packet data network 160. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 131. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a PDN connection (also referred to as EPS session) provides E2E UP connectivity between the remote unit and a PDN. The PDN connectivity procedure establishes an EPS Bearer, i.e., a tunnel between the remote unit 105 and a Packet Gateway ("P-GW"), not shown, in the mobile core network 130. In certain embodiments, there is a one-to-one mapping between an EPS Bearer and a QoS profile, such that all packets belonging to a specific EPS Bearer have the same QoS Class Identifier ("QCI").

As described in greater detail below, the remote unit 105 may use a first data connection (e.g., PDU Session) established with the first mobile core network 130 to establish a second data connection (e.g., part of a second PDU session) with the second mobile core network 140. When establishing a data connection (e.g., PDU session) with the second mobile core network 140, the remote unit 105 uses the first data connection to register with the second mobile core network 140.

The cellular base units 121 may be distributed over a geographic region. In certain embodiments, a cellular base unit 121 may also be referred to as an access terminal, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a Home Node-B, a relay node, a device, or by any other terminology used in the art. The cellular base units 121 are generally part of a radio access network ("RAN"), such as the 3GPP access network 120, that may include one or more controllers communicably coupled to one or more corresponding cellular base units 121. These and other elements of radio access network are not illustrated but are well known generally by those having ordinary skill in the art. The cellular base units 121 connect to the mobile core network 140 via the 3GPP access network 120.

The cellular base units 121 may serve a number of remote units 105 within a serving area, for example, a cell or a cell sector, via a 3GPP wireless communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121. Note that during NR operation on unlicensed spectrum (referred to as "NR-U"), the base unit 121 and the remote unit 105 communicate over unlicensed (i.e., shared) radio spectrum.

The non-3GPP access networks 130 may be distributed over a geographic region. Each non-3GPP access network 130 may serve a number of remote units 105 with a serving area. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via an interworking entity 135. The interworking entity 135 provides an interworking between the non-3GPP access network 130 and the mobile core network 140. The interworking entity 135 supports connectivity via the "N2" and "N3" interfaces. As depicted, both the 3GPP access network 120 and the interworking entity 135 communicate with the Access and Mobility Management Function ("AMF") 143 using a "N2" interface. The 3GPP access network 120 and interworking entity 135 also communicate with the UPF 141 using a "N3" interface. While depicted as outside the mobile core network 140, in other embodiments the interworking entity 135 may be a part of the core network. While depicted as outside the non-3GPP RAN 130, in other embodiments the interworking entity 135 may be a part of the non-3GPP RAN 130.

In certain embodiments, a non-3GPP access network 130 may be controlled by an operator of the mobile core network 140 and may have direct access to the mobile core network 140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. In contrast, a non-3GPP AN deployment that is not controlled by an operator (or trusted partner) of the mobile core network 140, does not have direct access to the mobile core network 140, or does not support the certain security features is referred to as a "non-trusted" non-3GPP access network. An interworking entity 135 deployed in a trusted non-3GPP access network 130 may be referred to herein as a Trusted Network Gateway Function ("TNGF"). An interworking entity 135 deployed in a non-trusted non-3GPP access network 130 may be referred to herein as a non-3GPP interworking function ("N3IWF"). While depicted as a part of the non-3GPP access network 130, in some embodiments the N3IWF may be a part of the mobile core network 140 or may be located in the data network 150.

In one embodiment, the mobile core network 140 is a 5G core ("5GC") or the evolved packet core ("EPC"), which may be coupled to a data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane functions including, but not limited to, an AMF 143 that serves the 5G-RAN 115, a Session Management Function ("SMF") 145, a Policy Control Function ("PCF") 147, an Authentication Server Function ("AUSF") 148, a Unified Data Management ("UDM") and Unified Data Repository function ("UDR").

The UPF(s) 141 is responsible for packet routing and forwarding, packet inspection, QoS handling, and external PDU session for interconnecting Data Network ("DN"), in the 5G architecture. The AMF 143 is responsible for termination of Non-Access Stratum ("NAS") signaling, NAS ciphering & integrity protection, registration management, connection management, mobility management, access authentication and authorization, security context management. The SMF 145 is responsible for session management (i.e., session establishment, modification, release), remote unit (i.e., UE) IP address allocation & management, DL data notification, and traffic steering configuration for UPF for proper traffic routing.

The PCF 147 is responsible for unified policy framework, providing policy rules to Control Plane ("CP") functions, access subscription information for policy decisions in UDR. The AUSF 148 acts as an authentication server.

The UDM is responsible for generation of Authentication and Key Agreement ("AKA") credentials, user identification handling, access authorization, subscription management. The UDR is a repository of subscriber information and can be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include an Network Exposure Function ("NEF") (which is responsible for making network data and resources easily accessible to customers and network partners, e.g., via one or more APIs), a Network Repository Function ("NRF") (which provides NF service registration and discovery, enabling NFs to identify appropriate services in one another and communicate with each other over Application Programming Interfaces ("APIs")), or other NFs defined for the 5GC. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a single Network Slice Selection Assistance Information ("S-NSSAI"), while a set of network slices for which the remote unit 105 is authorized to use is identified by NSSAI. In certain embodiments, the various network slices may include separate instances of network functions, such as the SMF and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 comprises an EPC, the depicted network functions may be replaced with appropriate EPC entities, such as a Mobility Management Entity ("MME"), Serving Gateway ("S-GW"), P-GW, Home Subscriber Server ("HSS"), and the like.

While FIG. 1 depicts components of a 5G RAN and a 5G core network, the described embodiments for using a pseudonym for access authentication over non-3GPP access apply to other types of communication networks and RATs, including IEEE 802.11 variants, GSM, GPRS, UMTS, LTE variants, CDMA 2000, Bluetooth, ZigBee, Sigfox, and the like. For example, in an 4G/LTE variant involving an EPC, the AMF 143 may be mapped to an MME, the SMF mapped to a control plane portion of a P-GW and/or to an MME, the UPF 141 may be mapped to an S-GW and a user plane portion of the P-GW, the UDM/UDR 149 may be mapped to an HSS, etc.

As depicted, a remote unit 105 (e.g., a UE) may connect to the mobile core network (e.g., to a 5G mobile communication network) via two types of accesses: (1) via 3GPP access network 120 and (2) via a non-3GPP access network 130. The first type of access (e.g., 3GPP access network 120) uses a 3GPP-defined type of wireless communication (e.g., NG-RAN) and the second type of access (e.g., non-3GPP access network 130) uses a non-3GPP-defined type of wireless communication (e.g., WLAN). The 5G-RAN 115 refers to any type of 5G access network that can provide access to the mobile core network 140, including the 3GPP access network 120 and the non-3GPP access network 130.

As background, in general, radio transmissions over fading channels recur to solutions consisting of maximizing in some form the signal to noise ratio ("SNR") of the information symbols given some knowledge of the system constraints (e.g., total available transmit power, channel resources, time resources), and given some CSI, respectively. In these regards, the conventional solutions seek to maximize the theoretically achievable ergodic rate by controlling some parameters of the transmission (e.g., power, modulation and coding schemes, precoding methods etc.). A representative solution for OFDM system in these regards is the waterfilling power adaptation policy (e.g., Tse, D., & Viswanath, P. (2005). Fundamentals of wireless communication. Cambridge University Press), which controls the power per channel subbands such that strong channels are exploited and assigned more transmit power, whereas the weak channels may even be left unpowered.

These strategies can be applied well in practice as well besides their clear theoretic merits of illustrating fundamental bounds on achievable throughput. However, their practical application is in fact limited when one carefully considers their assumptions. For instance, the optimal waterfilling method is applicable in ergodic sense only to time-invariant frequency-selective fading channels. Additionally, it depends on good CSI estimates, which periodically need to be updated if the channel changes, as is the case practically given fast fading channels such as the Vehicle-to-Everything ("V2X") and Frequency Range 2 (24250 MHz-52600 MHz) ("FR2") channels.

Moreover, such methods are concerned with maximizing the capacity, and hence, the achievable throughput. Alone however, these metrics are single-handedly not representative. Consider for instance scenarios of channel subbands outage, which are better characterized by the achievable detection robustness and bit/symbol error rate rather than capacity. To cater for the latter, error correction codes, beamforming in multiple-input multiple-output ("MIMO") settings and various implementation-specific diversity coding schemes (e.g., the Alamouti scheme (Alamouti, S. M. (1998). A simple transmit diversity technique for wireless communications. IEEE Journal on selected areas in communications, 16(8), 1451-1458) or other space-time codes (Giannakis, G. B., & Ma, X. (2007). U.S. Pat. No. 7,224,744. Washington, DC: U.S. Patent and Trademark Office), or the like) are used.

Figure 2:
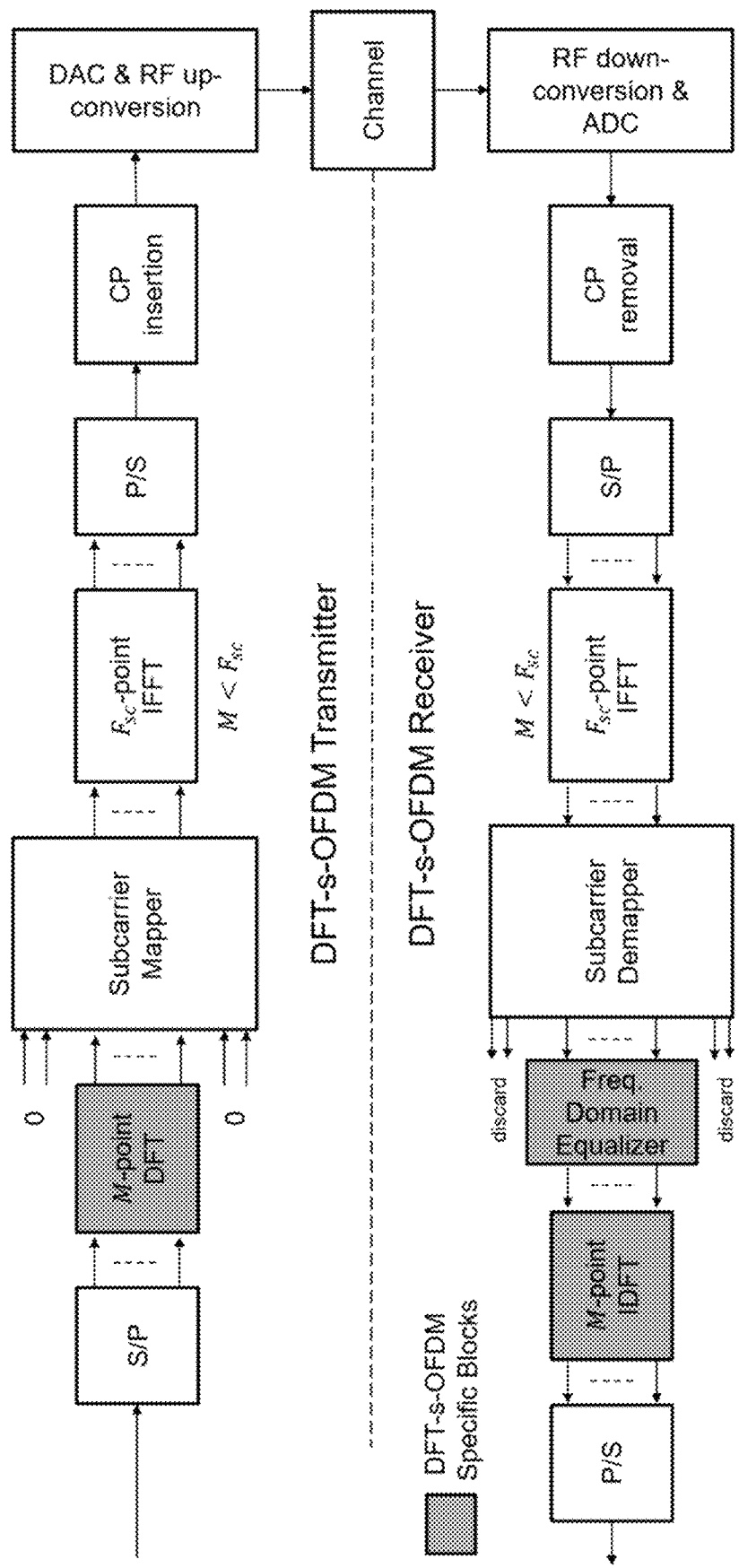
FIG. 2 is a diagram illustrating one embodiment of a DFT-s-OFDM transmitter-receiver modulation/demodulation signal processing chain.

Regarding DFT-s-OFDM, in one embodiment, a generic modulation scheme to counteract some of the non-ideal effects of OFDM, e.g., the high PAPR, is the DFT-s-OFDM. This employs a DFT transform to precode the information symbols in frequency-domain before applying the traditional inverse fast Fourier transform ("IFFT") associated with the OFDM modulator. Consequently, given the DFT properties, the conjugate transposed transformations are applied as matched filters on the receiver side as the DFT-s-OFDM demodulation. A simplified schematic of DFT-s-OFDM transceiver processing is represented in FIG. 2. As a result, in one embodiment, this reduces the multicarrier waveform of OFDM to a SC-FDM waveform.

DFT-s-OFDM is part of both LTE and 5G NR as the transform precoder for UL communications via SC-FDM where the PAPR reduction features are used to optimize UL power utilization and make better usage of radio frequency ("RF") front-end power amplifiers ("PAs"), reducing clipping and signal distortion whilst improving effective SNR.

Even though the information symbols are spread across the OFDM subcarriers, in one embodiment, the DFT-s-OFDM offers no protection or redundancy against potential subcarriers erasure events caused by deep fades of channel selectivity in frequency domain. In one embodiment, this leads to errors in detection that ought to be corrected by the error correction code ("ECC"). As a result, the error correction capacity of the ECC is diminished, which may severely impact the overall detection potential of a receiver.

In one embodiment, it is of interest to mitigate the performance limiting effects of a frequency-selective channel particularly in deployments of growing interest that promote high mobility, e.g., V2X communications, enhanced multipath in FR2, ultra-reliable low-latency communications ("URLLC") industrial internet of things ("IIoT") scenarios within factory floors, as well as beyond FR2 communications at high frequencies in the TeraHz and visible light frequency ranges. The latter frequency-selectiveness may be due to molecular absorption effects combined with clustered multipath propagation which affect the channel subbands increasingly with the center frequency, pulse bandwidth, and communication distance (Han, C., Bicen, A. O., & Akyildiz, I. F. (2015). Multi-wideband waveform design for distance-adaptive wireless communications in the terahertz band. IEEE Transactions on Signal Processing, 64(4), 910-922).

In the light of all the above, in one embodiment, a generic precoding strategy adding redundancy against deep fades of the channel with minimal overhead and wide applicability is desirable.

In general, in one embodiment, the present disclosure presents a generic precoding design and an apparatus for a generic and easily scalable linear transform precoder based on a redundant multiple description encoding of information data symbols. The latter may be realized by a spherical representation as an approximate maximum distance separable code providing configurable protection against deep channel fades. The flexibility of the design, in one embodiment, is proven via a harmonic realization in which the trade-off between signaling overhead and channel selectivity robustness is easily configurable.

The channel selectivity may be described as an equivalent erasure channel. This interpretation, in one embodiment, holds from an information-theoretic perspective whenever the invested transmission power on a symbol within a subband of the channel fails to raise the signal power above the noise floor at the receiver side within that subband. This effect may be a consequence of the low channel to noise ratio ("CNR") associated with such deep fades which requires significant transmission power increase to avoid the information outage within a particular channel subband of interest.

Figure 3:
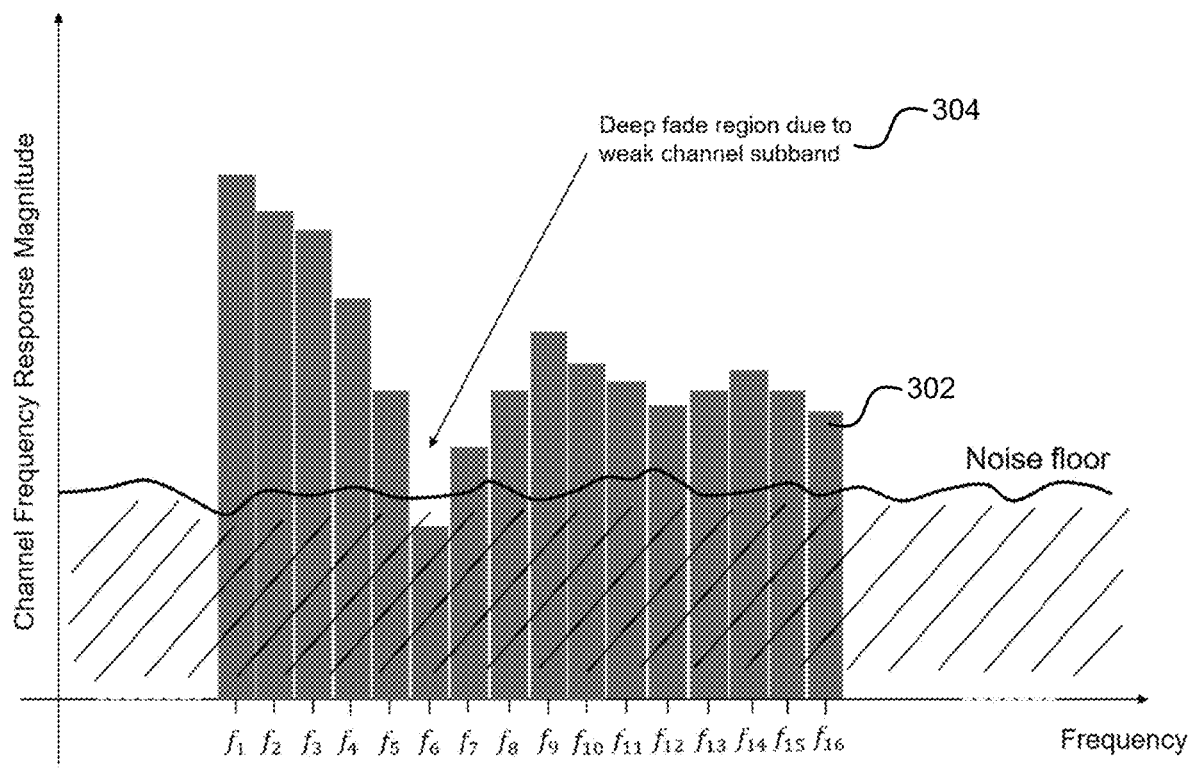
FIG. 3 is a diagram illustrating one embodiment of a subchannel-level multiple description of the communication channel under OFDM modulation.

FIG. 3 illustrates this phenomenon where some of the channel subbands 302 are in deep fade 304 such that information symbols conveyed over the respective subfrequencies fail to be recovered with sufficient certainty for satisfactory performance by any detector. In one embodiment, one can refer to those as being in outage from an information-theoretic perspective given a configured modulation scheme and an available SNR at the receiver side.

In one embodiment, the problem of robustly transmitting information in the presence of frequency-domain selective media can be reformulated as a multiple description coding task. This may be a consequence of the above remark and on the fact that the OFDM modulation separates channels into parallel fading representations. As such, the parallel subchannels can be regarded as alternative descriptors to exchange information, each with its own base CNR given the real-world surroundings. These paths can therefore spread the information symbols in a redundant way, such that if several paths fade beyond the point of recoverability, the rest of the paths (subchannels) can robustly recover enough essential information to reconstruct the transmitted original content.

Albeit, in one embodiment, Q-ary erasure codes exist that present good theoretic properties (e.g., Q-ary Reed-Solomon codes as maximum distance separable codes), these are not generic to accommodate various constellations within the IQ-plane as their construction is based on specific discrete cyclic group realizations. A solution, in one embodiment, would be to consider analog codes in the complex-plane which would be widely applicable to any IQ constellation set one chooses as a basis to encode binary information bits.

Such complex-valued analog multiple description codes with perfect erasure guarantees (e.g., can recover up to k erasures for any k introduced redundancies) would resolve in practice to some Grassmannian frame design (Ch. 1, Ch. 9, Casazza, P. G., & Kutyniok, G. (Eds.). (2012). Finite frames: Theory and applications. Springer Science & Business Media) based on the mathematics of redundant representations in signal processing (Ch. 3 Stoica, R. A. (2019). Frame-theoretic Designs for Future Wireless Communications (Doctoral dissertation, Jacobs University Bremen), (Ch. 3, Strohmer, T., & Heath Jr, R. W. (2003). Grassmannian frames with applications to coding and communication. Applied and computational harmonic analysis, 14(3), 257-275). However, the existence of such codes, in one embodiment, is just a conjecture and only particular realizations of such codes are known in practice, particular to specific geometries (Conway, J. H., Hardin, R. H., & Sloane, N. J. (1996). Packing lines, planes, etc.: Packings in Grassmannian spaces. Experimental mathematics, 5(2), 139-159).

Without loss of generality, a generic construction is considered, which is practical and scalable, demonstrating approximate characteristics to perfect Grassmannian codes. Consider to this extent the following setup of a code consisting of:

a codebook of size N; and
codewords of dimensionality M within the inner product space of $\mathbb{C}^M$.

The Grassmannian code main property is in fact analogous to the maximum distance separability of Q-ary codewords and it refers to the maximum distance at which the codewords of the complex-valued codebook are uniformly spread at based on the dimensionality constraints of the codebook. Concretely, the Grassmannian code property resumes to finding a packing which satisfies:

$$t^2 = \min_{S} \max_{k \neq l} |\langle s_k, s_l \rangle|^2 \qquad \text{Eq. 1}$$

$$\text{s.t. } k \neq l \in \{1, 2, \ldots, N\}$$

$$\|s_j\|^2 = 1, \forall j$$

$$S \in \mathbb{C}^{M \times N}, M < N.$$

with t achieving the equality of the Welch Bound ("WB") (Casazza, P. G., & Kutyniok, G. (Eds.). (2012). Finite frames: Theory and applications. Springer Science & Business Media), e.g.:

$$t \geq \sqrt{\frac{N-M}{M(N-1)}}. \qquad \text{Eq. 2}$$

Since finding the solution to Eq. 1 with the additional constraint of Eq. 2 is not guaranteed to lead to a Grassmannian codebook regardless of the code dimensionality in N and M, respectively, a relaxed problem is considered for the code design as Eq. 3 below:

$$t^2 = \min_{S} \max_{k \neq l} |\langle s_k, s_l \rangle|^2 \qquad \text{Eq. 3}$$

$$\text{s.t. } k \neq l \in \{1, 2, \ldots, N\}$$

-continued $$SS^H = \frac{N}{M}I_M$$

$$\|s_j\|^2 = 1, \forall j$$

$$S \in \mathbb{C}^{M \times N}, M < N.$$

The added constraint of $$SS^H = \frac{N}{M}I_M$$

between Eq. 3 and the ensemble of Eq. 1 and Eq. 2 implies tightness and equal spread of a targeted $$\rho = \frac{N}{M}$$

redundant representation across the M dimensions for the linear codebook $\mathcal{S}$ (Ch. 3, Stoica, R. A. (2019). Frame-theoretic Designs for Future Wireless Communications (Doctoral dissertation, Jacobs University Bremen). An illustrative schematic to highlight this property and statement is presented in FIG. 4, where the redundancy function (Casazza, P. G., & Kutyniok, G. (Eds.). (2012). Finite frames: Theory and applications. Springer Science & Business Media):

$$\rho_S(x) \triangleq \sum_{m=1}^{M} \left| \left\langle \frac{x}{\|x\|_2}, s_m \right\rangle \right|^2 \qquad \text{Eq. 4}$$

has been used to plot the quantitative redundant representation of two codebooks for any vector across the unit M-sized hypersphere. Note that the extension to any vector in the M-sized complex signal space holds by means of normalization and associated scaling.

Figure 4:
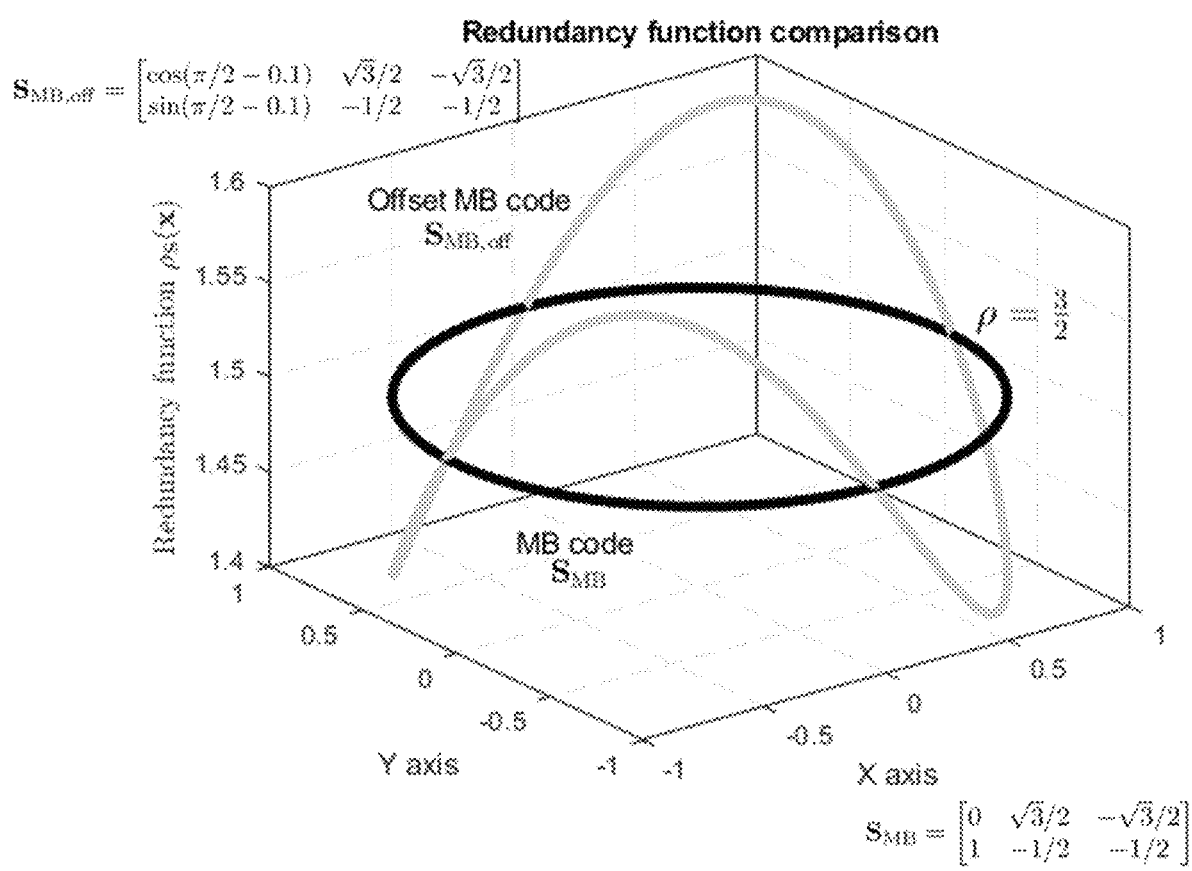
FIG. 4 is a diagram illustrating one embodiment of a redundancy function illustrating quantitatively and qualitatively the redundancy of an example overloaded representation of size N=3 in $\mathbb{R}^2$.

FIG. 4 depicts a redundancy function that illustrates quantitatively and qualitatively the redundancy of an example overloaded representation of size N=3 in $\mathbb{R}^2$. The selected codebooks are the tight unit-norm Mercedes-Benz codebook, and respectively a slightly displaced unit-norm version thereof. The codebook dimensionality should translate to an ideal redundancy $$\rho = \frac{N}{M} = 1.5.$$

It is seen that this is the case for tight overloaded representations which have the property of uniform redundancy with the additional result that unit-norm overloaded representations exhibit uniform redundancy given by their dimensionality ratio $$\rho = \frac{N}{M},$$

(Stoica, R. A. (2019). Frame-theoretic Designs for Future Wireless Communications (Doctoral dissertation, Jacobs University Bremen)).

In one embodiment, codes designed based on Eq. 3 may be referred to as $\mathcal{S} = S(M, N, t)$, where, for instance, the optimal Grassmannian codes are a subset thereof as $$\mathcal{S}\left(M, N, \sqrt{\frac{N-M}{M(N-1)}}\right).$$

It follows that any $\mathcal{S}$ based on Eq. 3 is a unit-norm, i.e., $\|s_j\|^2=1$, $\forall j$, overloaded, i.e., N>M, complex representation of a codebook with uniform redundancy $$\rho = \frac{N}{M}$$

and an approximate maximum separable distance property. The latter is based on the introduced relaxation of Eq. 3, which does not constrain t to its minimum WB Equality ("WBE") value anymore, but instead seeks to closely approximate it to the attainable bound in a best effort sense.

Figure 5:
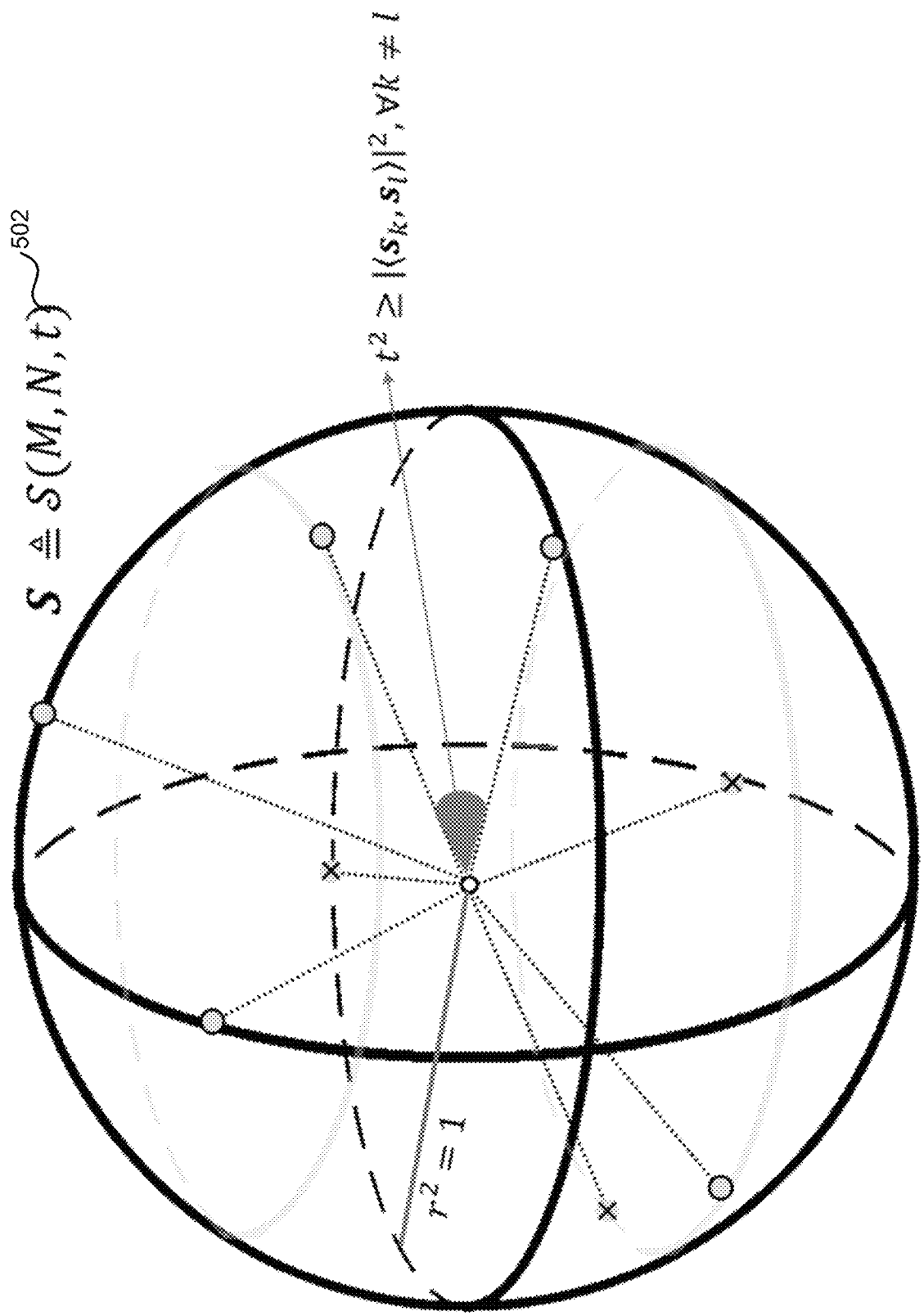
FIG. 5 is a diagram illustrating one embodiment of a spherical codebook S(M, N, t) construction where N points are selected on the M-dimensional unit hypersphere.

The unit-norm equality constraint on the individual codewords enforces a well-defined energy normalization relevant to practical precoding apparatuses and systems realizations. Moreover, it simultaneously defines the search space of the codewords to a unit hypersphere of dimensionality M. As a result, the outcome of the proposed precoder S(M, N, t) is a spherical design, as displayed in FIG. 5. The spherical precoder S 502, in one embodiment, selects a finite set of N points on an M-dimensional unit hypersphere such that the maximum distance separability of these N codewords is pairwise and ensemble-wise controlled and maximized given the inner product metric.

In one embodiment, the general application of the proposed analog precoder S(M, N, t) to redundantly protect transmissions against channel selective fading is thus motivated by the uniform redundancy and approximate maximum distance separability desired for multiple description coding. These jointly offer guarantees of recoverability for at most:

$$k < \frac{\sqrt{M(N-1)(N-M)}}{N} + 1, k \in \mathbb{N}, \forall N < M^2 \qquad \text{Eq. 5}$$

potential erasures based on the dimensionality and design of the codebook as an approximate tight spherical representation uniformly spreading the codewords within the M-dimensional signal space. In one embodiment, the bound defined in Eq. 5 is derived starting from the general Corollary 7.2 in Casazza, P. G., & Kutyniok, G. (Eds.) (2012) Finite frames: Theory and applications, Springer Science & Business Media, and mathematically expanded upon, as described herein, to arrive at Eq. 5. The bound is consistent with orthonormal transformation precoders (e.g., DFT) as in for N=M, k<1, k∈ $\mathbb{N}$, such that k=0, and as expected without redundancy no potential erasures may be recovered.

Figure 6:
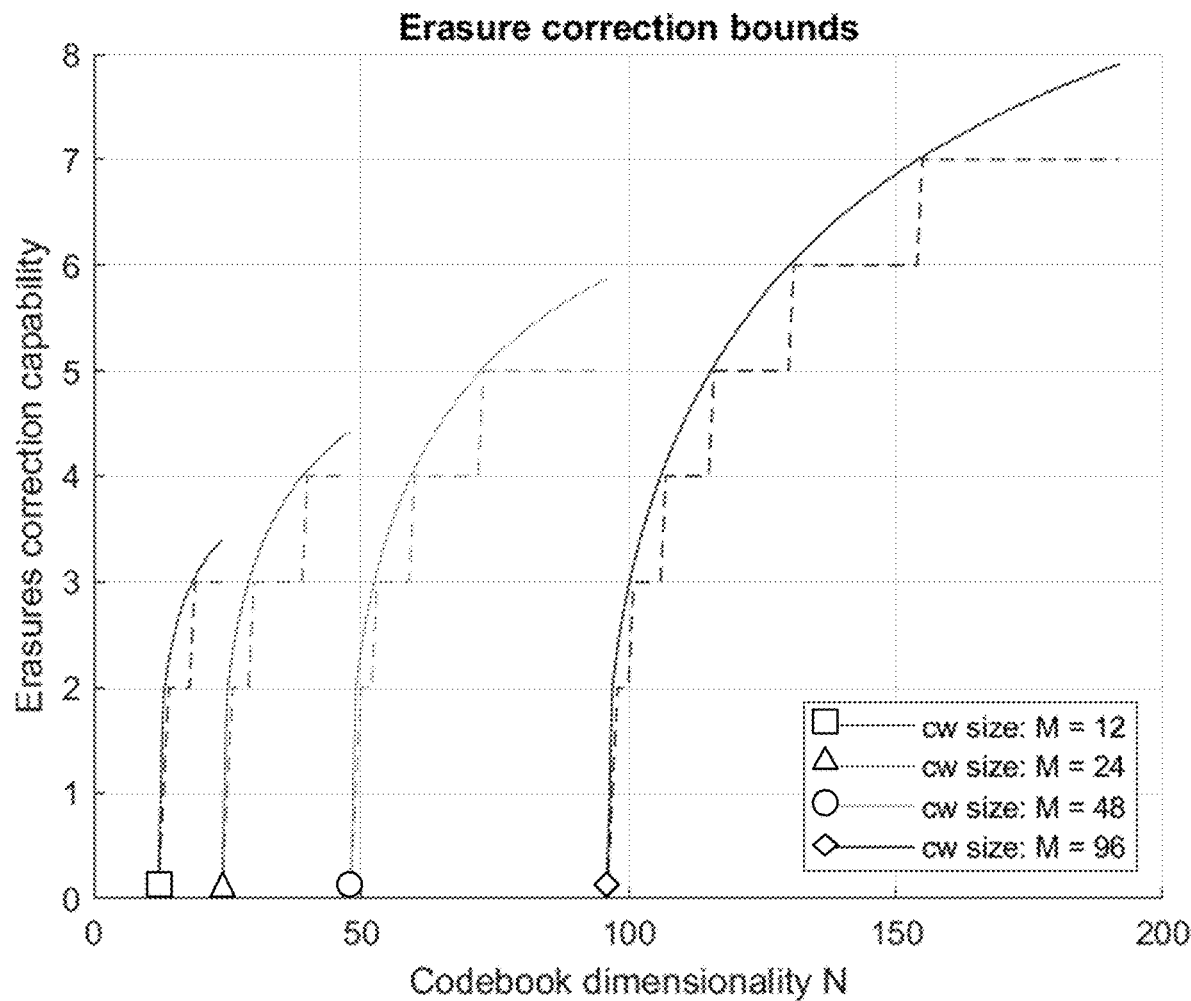
FIG. 6 is a diagram illustrating one embodiment of continuous and discrete upper bounds of erasure correction capability of proposed codebook design for various codeword and codebook lengths.

To this end, in one embodiment, the method and codebook design provide robustness against channel selective effects. This argument is illustrated in FIG. 6 where the erasure correction capacity is plotted accordingly alongside the quantized limits given the discreteness of the potential number of errors. FIG. 6, in one embodiment, depicts an indicative for the redundant numerology to target a guaranteed level of protection based on the analog spherical redundant precoder design proposed.

In some embodiments, the precoding process is defined as a general non-linear function, covering non-linear precoding. The design can be done by parameterized training (e.g., like a deep neural network ("DNN"), within a function space constructed via a known reproducing kernel Hilbert space ("RKHS")), where other objective and/or constraint items can be added to Eq. 3.

Some embodiments may consider codebook realizations of the transform-based redundant precoder to offer protection against channel selectivity where the objective/constraint items of Eq. 3 can be extended/modified to reduce the PAPR of the resultant waveform given a particular modulation scheme. Since the resultant linear codebook is permutation invariant, the optimal mappings of precoded symbols to resource elements for reducing PAPR can be jointly considered within the codebook design, or alternatively, separately by dedicated post-precoding pre-modulation blocks. To this end, complementary permutation-based, shuffle-based, and shift-based methods to achieve additional PAPR and subsequent bandwidth ("BW") filtering may be embedded by the said embodiments jointly within the design problem via some objectives/constraints pertaining to a random permutation matrix or post-processing blocks.

Other embodiments may target selective redundancy protection and thus modify the constraints of the code design towards achieving a particular codebook spectral representation, compactly described by the code operator $SS^H$. Thus, to meet design objectives pertaining to unequal error protection ("UEP") of prospective subbands, erasure of the communication channel of the spectrum of the codebook redundancy may not be flat anymore, e.g., $SS^H = I_M$, but instead designed to a particular shape to match a priori knowledge of deep channel fades that may lead to erroneous transmissions.

In one embodiment, an embodiment may consider codebook designs where the family of the codebook is constrained to a particular subset to aid hardware- and/or software-efficient implementations where the analog codebooks of Eq. 3 are effectively quantized without degradation of performance. For this purpose, a practical system realization may consider a family of harmonic codebooks such that harmonic multiples of the N-th root of unity define the individual codeword entries based on the twiddle factor $$\omega_N = \exp\left(-\frac{j2\pi}{N}\right).$$

This in turn implies introducing the constraint that $\forall s_j \in S$, $s_{j,m} \in \{\omega_N^k | k \in \mathbb{Z}\}$, $1 \leq m \leq M$, $1 \leq j \leq N$ as an extension of Eq. 3.

One such codebook implementation could therefore be based on a projection of a N-point DFT (denoted hereafter as $W_N$) to the M-sized complex-valued space of the codewords. An embodiment may achieve this by pruning N−M harmonics out of the orthonormal basis $W_N$, up to a rescaling by $$\sqrt{\frac{N}{M}}$$

to fulfill the rest of the constraints Eq. 3. The obtained analog codebook is quantized by the discrete nature of the twiddle factors forming its codewords and may be thus effectively realized in hardware and software. In addition, the codebook information is expressed entirely by its dimensionality, e.g., M, N, and the indices of the N-DFT N−M pruned harmonics on which the codebook is constructed upon.

Figure 7:
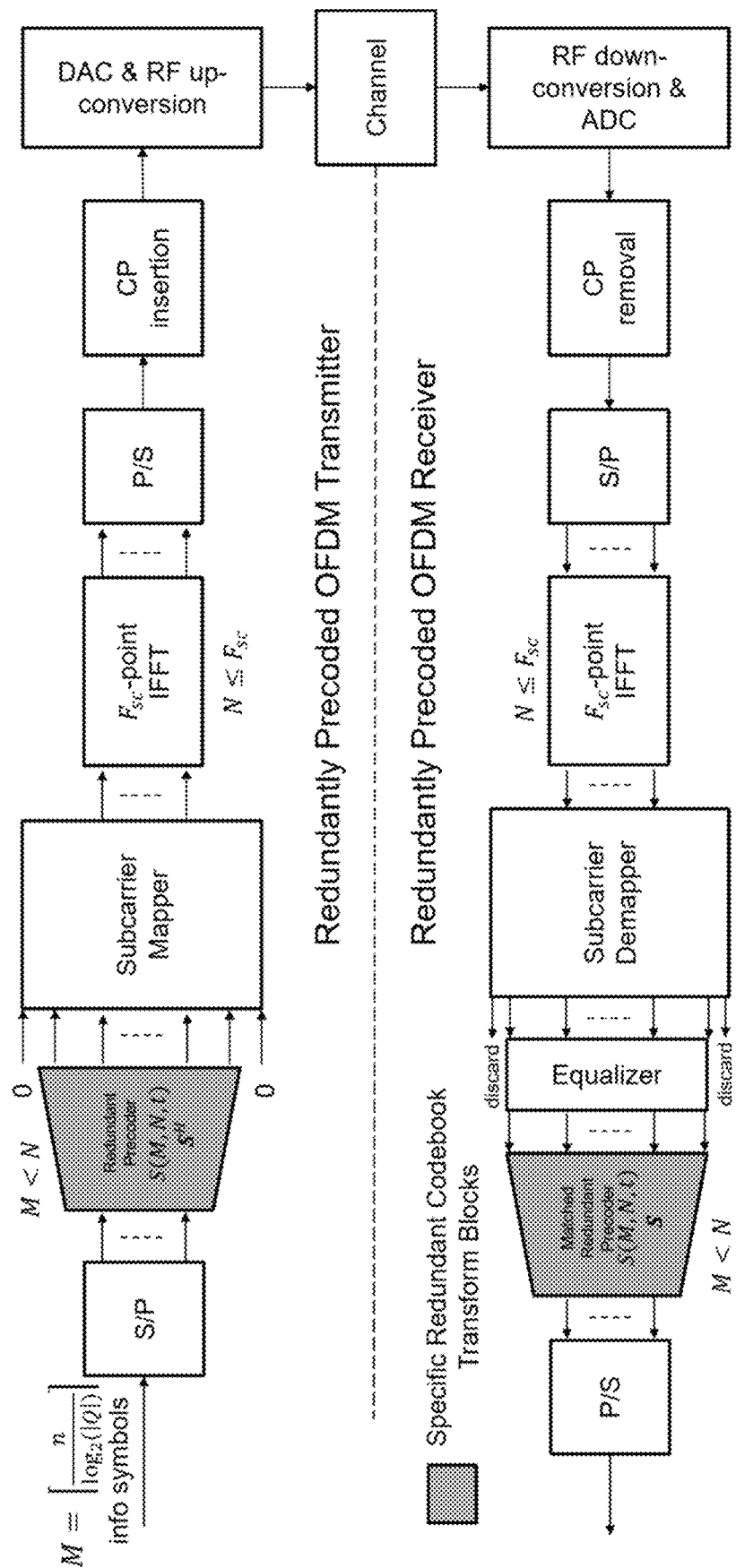
FIG. 7 is a diagram illustrating one embodiment of redundant frequency-selective transformation-based precoder realization for OFDM-based systems.

The harmonic codebook design may be utilized as part of OFDM systems as a realization of transform precoding replacing the conventional DFT within DFT-s-OFDM. The latter, in one embodiment, however, lacks any redundant mechanisms to provide protection against frequency-selective channels for OFDM-based systems. The realization is depicted in FIG. 7, which depicts a redundant frequency-selective transformation-based precoder realization for OFDM-based systems with the transmitter-side main processing blocks illustrated on the top and the receiver-side main processing blocks on the bottom. In one embodiment, shown in FIG. 7, the codebook is used as a transformation precoder to redundantly precode M information symbols (originating from n coded/uncoded information bits mapped to Q-ary discrete IQ constellation points) to N symbols to be transmitted over the air. These are mapped to the $F_{sc} \geq N$ available transmission resources, e.g., OFDM subcarriers.

In one embodiment, the additional N−M redundant precoded symbols that need to be mapped to physical resource elements may be mapped accordingly to freely available physical resource elements (non-information carrying, e.g., 0 carrying subbands), as displayed in FIG. 7, or may be allocated additional physical resource elements in contiguous on non-contiguous bandwidth parts ("BWP") for transmission.

At the receiver, in one embodiment, the redundant transform is diagonalizable given matched filtering over any channel realization. Thus, no additional complexity for the detection and decoding of information symbols is introduced post the matched filtering operation. This is also visible in FIG. 7, as the transmit-receiver processing of information symbols excluding channel equalization is summarized by:

$$y = SW_{F_{sc}} \cdot (W_{F_{sc}}^H H W_{F_{sc}}) \cdot W_{F_{sc}}^H S^H x + SW_{F_{sc}} \cdot w \qquad \text{Eq. 6}$$

The circular convolution operator for the channel transmission, in one embodiment, is rewritten as the circulant Toeplitz operator diagonalizable by the unitary DFT as $W_{F_{sc}}^H H W_{F_{sc}}$ to the spectral channel frequency response H. After the OFDM demodulation, in one embodiment, the precoded symbol $S^H x$ is filtered by the precoder matched filter S. Post-simplification of the unitary transforms, in one embodiment, the equivalent channel matrix $SHS^H$ is of full rank matching the signal space, e.g., M, if the diagonal channel matrix H does not have more than N−M diagonal erasures, i.e., deep fades below the noise floor. This implies, in one embodiment, that the M information symbols originally transmitted as x are recoverable despite unknown frequency-selective deep fades of the channel at the cost of precoding N−M redundant symbols using the proposed codebook design as a transform precoder.

This is in contrast with conventional DFT-s-OFDM precoders used, for instance, in 3GPP UL systems (Han, C., Bicen, A. O., & Akyildiz, I. F. (2015). Multi-wideband waveform design for distance-adaptive wireless communications in the terahertz band. IEEE Transactions on Signal Processing, 64(4), 910-922) which are impacted by deep channel subband fades as the signal energy is essentially spread across only M subcarriers without any redundancy. On the receiver side, in one embodiment, despreading is applied via the inverse transform which averages the noise across all the M subcarriers and subsequently distorts all data symbols increasingly reducing the overall link robustness to such effects. In contrast to DFT-s-OFDM, in one embodiment, the proposed codebook and its associated transform embeds uniform redundancy across N>M subcarriers, and as such, provides protection at symbol-level against channel subband deep fades. On the other hand, the DFT-s-OFDM detection accuracy is degraded as a low SNR corresponding to a deep fade region decreases performance over all M information symbols upon the despreading operation for information recovery.

An effective information retrieval realization at the receiver side may consider various time or frequency equalization signal processing techniques for the channel matrix $W_N^H H W_N$ (in time domain) or H (in frequency domain). Post equalization, the effect of the channel is reduced such that it is approximately the identity operator within the uncertainty bounds of the CSI estimation process, and as such, the matched filtering of the redundant transform does not require complex matrix inversion operations for symbol detection.

An embodiment applying the proposed harmonic frequency-selective redundant precoder at a transmitter may signal to the receiver the selected configuration, including the enablement of the redundant precoding as a bit field of information, the M-dimensionality of the precoder as an integer of bit width $\lceil \log_2(M) \rceil$ and the redundancy introduced r=N−M as an additional integer of bit width $\lceil \log_2(r) \rceil$. Additionally, in one embodiment, the signaling of the N−M indices of the pruned harmonics to form the codebook starting from an N-DFT or oversampled realization thereof may be signaled either as a bitfield or as a set of integers to determine a specific transform realization. This precoding relevant information may be signaled either explicitly or via an index mapping the information to a shared tabulated representation of possible configurations. The information, in one embodiment, shall be transmitted as part of control information xCI in either UL/DL or SL realizations. The individual mappings of the precoded redundant N symbols to the available physical resource elements $F_{sc}$ may be signaled as part of the data reference signals (e.g., DM-RS) or over the control channel information signals (e.g., Downlink Control Information ("DCI"), Uplink Control Information ("UCI"), Sidelink Control Information ("SCI")).

In another embodiment, the additional N−M resources necessary to transmit the frequency-selective redundant precoded symbols may be transmitted over contiguous physical resource elements as part of the same or adjacent resource blocks, or alternatively, over non-contiguous resource elements as part of other non-adjacent physical resource elements and/or distinct BWP resource elements. The selection of the non-contiguous realizations for transport of the N−M precoded symbols may be configured and synchronized by higher-layers (e.g., Radio Resource Control ("RRC"), Medium Access Control ("MAC")) and the configuration shall be shared with the receiver via the control channel information reference signals (e.g., DCI, UCI, SCI).

An embodiment considering MIMO multi-layered communications systems may individually precode each layer by the proposed transform precoder. Common-layer precoding configurations may be reported jointly, whereas distinct configurations may be reported on a per-layer basis.

Figure 8:
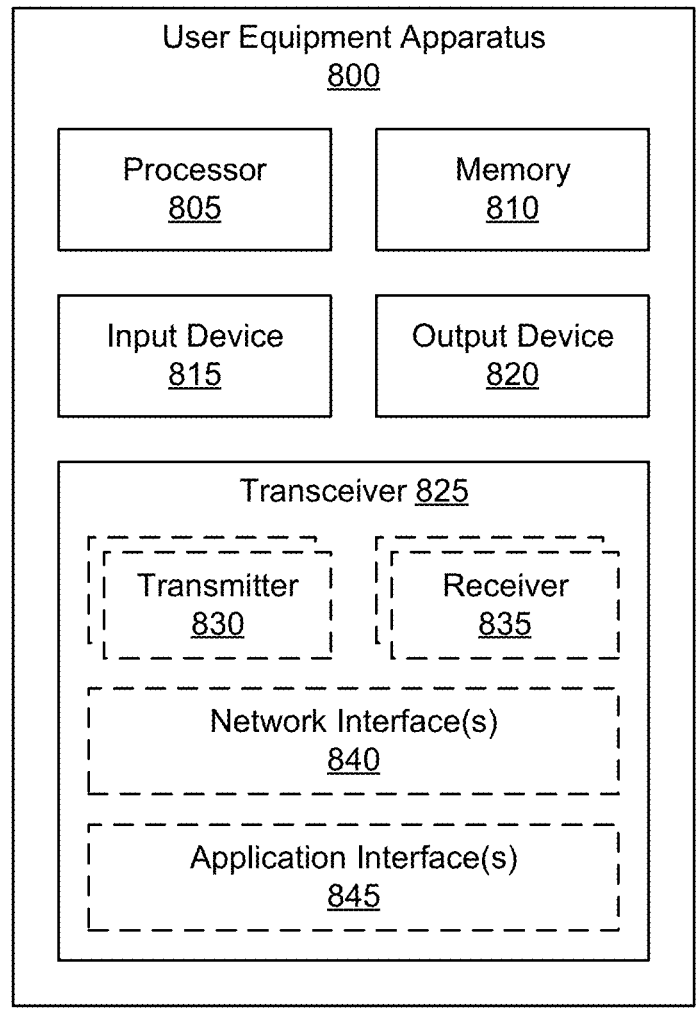
FIG. 8 is a block diagram illustrating one embodiment of a user equipment apparatus that may be used for precoding wireless communications.

FIG. 8 depicts a user equipment apparatus 800 that may be used for precoding wireless communications, according to embodiments of the disclosure. In various embodiments, the user equipment apparatus 800 is used to implement one or more of the solutions described above. The user equipment apparatus 800 may be one embodiment of the remote unit 105 and/or the UE, described above. Furthermore, the user equipment apparatus 800 may include a processor 805, a memory 810, an input device 815, an output device 820, and a transceiver 825.

In some embodiments, the input device 815 and the output device 820 are combined into a single device, such as a touchscreen. In certain embodiments, the user equipment apparatus 800 may not include any input device 815 and/or output device 820. In various embodiments, the user equipment apparatus 800 may include one or more of: the processor 805, the memory 810, and the transceiver 825, and may not include the input device 815 and/or the output device 820.

As depicted, the transceiver 825 includes at least one transmitter 830 and at least one receiver 835. In some embodiments, the transceiver 825 communicates with one or more cells (or wireless coverage areas) supported by one or more base units 121. In various embodiments, the transceiver 825 is operable on unlicensed spectrum. Moreover, the transceiver 825 may include multiple UE panel supporting one or more beams. Additionally, the transceiver 825 may support at least one network interface 840 and/or application interface 845. The application interface(s) 845 may support one or more APIs. The network interface(s) 840 may support 3GPP reference points, such as Uu, N1, PC5, etc. Other network interfaces 840 may be supported, as understood by one of ordinary skill in the art.

The processor 805, in one embodiment, may include any known controller capable of executing computer-readable instructions and/or capable of performing logical operations. For example, the processor 805 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 805 executes instructions stored in the memory 810 to perform the methods and routines described herein. The processor 805 is communicatively coupled to the memory 810, the input device 815, the output device 820, and the transceiver 825. In certain embodiments, the processor 805 may include an application processor (also known as "main processor") which manages application-domain and operating system ("OS") functions and a baseband processor (also known as "baseband radio processor") which manages radio functions.

In various embodiments, the processor 805 and transceiver 825 control the user equipment apparatus 800 to implement the above described UE behaviors. In one embodiment, the processor 805 determines a transform precoder. In one embodiment, the processor 805 precodes a plurality of source information symbols over a set of available physical transmission resources using the determined transform precoder. In one embodiment, the processor 805 combines the precoded source information symbols using a redundant representation.

In one embodiment, the determined transform precoder comprises a spherical codebook S(M, N, t) of size N with codewords designed on the surface of an M-sized hypersphere at an angular minimum distance among codewords of acos (t).

In one embodiment, the processor 805 optimizes the determined transform precoder to provide uniform redundancy across M dimensions defining an input space for the determined transform precoder. In one embodiment, the determined transform precoder is configured to protect and recover up to a specified number of erasures. In one embodiment, an upper bound of the specified number of erasures is defined by $$\frac{\sqrt{M(N-1)(N-M)}}{N}+1.$$

In one embodiment, the spherical codebook S(M, N, t) comprises codewords that are harmonics formed of complex-valued N-th roots of unity. In one embodiment, the determined transform precoder is based on at least one of an N–M truncated DFT and a Fast Fourier Transform ("FFT").

In one embodiment, the set of available physical transmission resources comprises a set of available $F_{sc}$ physical information carrier resources associated with a multi-carrier modulation and multiplexing technique for transmitting information using the determined transform precoder.

In one embodiment, the processor 805 codes and maps the plurality of source information symbols to the set of available physical information carrier resources $F_{sc}$ with M<N≤$F_{sc}$ using the determined transform precoder. In one embodiment, the precoded N information symbols of the determined precoder provide an additional N–M redundant representation of the source information symbols, the redundant representation being used at a receiver node to recover potential lost source information symbols due to media transmission impairments between the transmitter node and the receiver node.

In one embodiment, the processor 805 transmits one or more of the following data elements to the receiver node over the one of the control reference signal and the data reference signal: a turn-on/off activation bit field, a field representing the M-dimensionality of the determined transform precoder selected as an integer of a maximum bit width $\lceil \log_2(M) \rceil$, a field representing the N-dimensionality of the determined transform precoder selected as an integer of a maximum bit width $\lceil \log_2(N) \rceil$, and a mapping of the redundant precoded N symbols to the available $F_{sc}$ physical resources.

In one embodiment, the transmitted data elements are indexed based on a common reference table shared between the transmitter node and the receiver node. In one embodiment, the processor 805 maps the redundantly precoded N symbols one of contiguously, over a channel band up to $F_{sc}$ available physical information carrier resource elements and non-contiguously, across distinct channel bands up to $F_{sc}$ physical information carrier resources.

In one embodiment, the processor 805 optimizes the determined transform precoder to provide selective redundancy across M dimensions defining an input space for the determined transform precoder based on at least one of an available CSI profile at the transmitter node, a desired UEP redundant representation of the source information symbols, and an improvement in radio frequency transmission characteristics between the transmitter node and the receiver node, comprising at least one of PAPR and error vector magnitude ("EVM") given a predetermined coding and modulation scheme ("MCS") configuration.

The memory 810, in one embodiment, is a computer readable storage medium. In some embodiments, the memory 810 includes volatile computer storage media. For example, the memory 810 may include a RAM, including dynamic RAM ("DRAM"), synchronous dynamic RAM ("SDRAM"), and/or static RAM ("SRAM"). In some embodiments, the memory 810 includes non-volatile computer storage media. For example, the memory 810 may include a hard disk drive, a flash memory, or any other suitable non-volatile computer storage device. In some embodiments, the memory 810 includes both volatile and non-volatile computer storage media.

In some embodiments, the memory 810 stores data related to precoding wireless communications. For example, the memory 810 may store various parameters, panel/beam configurations, resource assignments, policies, and the like as described above. In certain embodiments, the memory 810 also stores program code and related data, such as an operating system or other controller algorithms operating on the user equipment apparatus 800.

The input device 815, in one embodiment, may include any known computer input device including a touch panel, a button, a keyboard, a stylus, a microphone, or the like. In some embodiments, the input device 815 may be integrated with the output device 820, for example, as a touchscreen or similar touch-sensitive display. In some embodiments, the input device 815 includes a touchscreen such that text may be input using a virtual keyboard displayed on the touchscreen and/or by handwriting on the touchscreen. In some embodiments, the input device 815 includes two or more different devices, such as a keyboard and a touch panel.

The output device 820, in one embodiment, is designed to output visual, audible, and/or haptic signals. In some embodiments, the output device 820 includes an electronically controllable display or display device capable of outputting visual data to a user. For example, the output device 820 may include, but is not limited to, an LCD display, an LED display, an OLED display, a projector, or similar display device capable of outputting images, text, or the like to a user. As another, non-limiting, example, the output device 820 may include a wearable display separate from, but communicatively coupled to, the rest of the user equipment apparatus 800, such as a smart watch, smart glasses, a heads-up display, or the like. Further, the output device 820 may be a component of a smart phone, a personal digital assistant, a television, a table computer, a notebook (laptop) computer, a personal computer, a vehicle dashboard, or the like.

In certain embodiments, the output device 820 includes one or more speakers for producing sound. For example, the output device 820 may produce an audible alert or notification (e.g., a beep or chime). In some embodiments, the output device 820 includes one or more haptic devices for producing vibrations, motion, or other haptic feedback. In some embodiments, all, or portions of the output device 820 may be integrated with the input device 815. For example, the input device 815 and output device 820 may form a touchscreen or similar touch-sensitive display. In other embodiments, the output device 820 may be located near the input device 815.

The transceiver 825 communicates with one or more network functions of a mobile communication network via one or more access networks. The transceiver 825 operates under the control of the processor 805 to transmit messages, data, and other signals and also to receive messages, data, and other signals. For example, the processor 805 may selectively activate the transceiver 825 (or portions thereof) at particular times in order to send and receive messages.

The transceiver 825 includes at least transmitter 830 and at least one receiver 835. One or more transmitters 830 may be used to provide UL communication signals to a base unit 121, such as the UL transmissions described herein. Similarly, one or more receivers 835 may be used to receive DL communication signals from the base unit 121, as described herein. Although only one transmitter 830 and one receiver 835 are illustrated, the user equipment apparatus 800 may have any suitable number of transmitters 830 and receivers 835. Further, the transmitter(s) 830 and the receiver(s) 835 may be any suitable type of transmitters and receivers. In one embodiment, the transceiver 825 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 825, transmitters 830, and receivers 835 may be implemented as physically separate components that access a shared hardware resource and/or software resource, such as for example, the network interface 840.

In various embodiments, one or more transmitters 830 and/or one or more receivers 835 may be implemented and/or integrated into a single hardware component, such as a multi-transceiver chip, a system-on-a-chip, an ASIC, or other type of hardware component. In certain embodiments, one or more transmitters 830 and/or one or more receivers 835 may be implemented and/or integrated into a multi-chip module. In some embodiments, other components such as the network interface 840 or other hardware components/circuits may be integrated with any number of transmitters 830 and/or receivers 835 into a single chip. In such embodiment, the transmitters 830 and receivers 835 may be logically configured as a transceiver 825 that uses one more common control signals or as modular transmitters 830 and receivers 835 implemented in the same hardware chip or in a multi-chip module.

Figure 9:
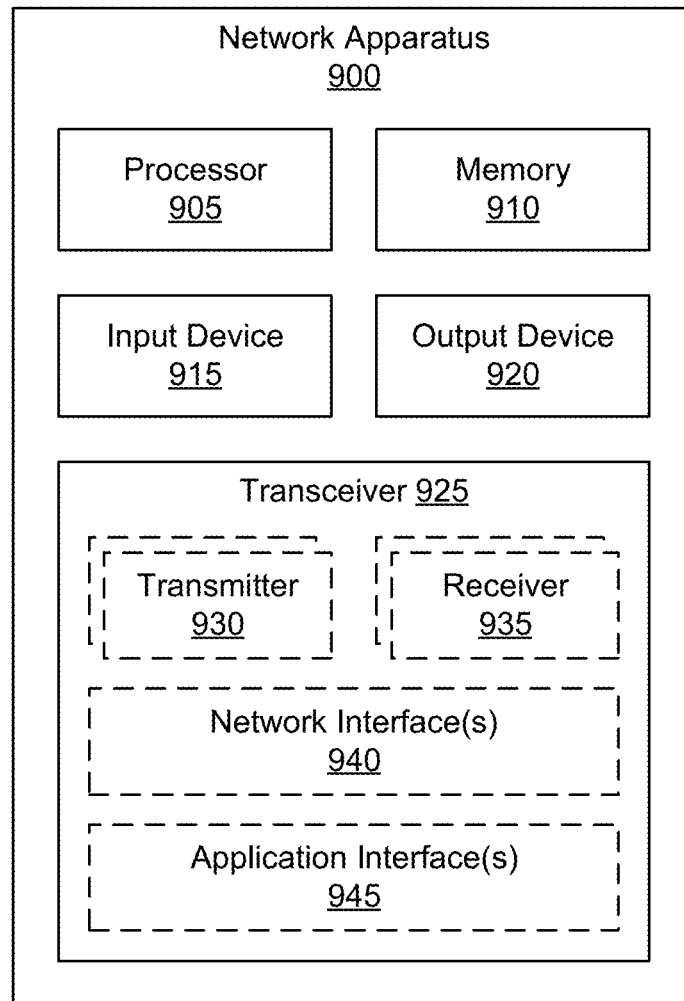
FIG. 9 is a block diagram illustrating one embodiment of a network apparatus that may be used for precoding wireless communications.

FIG. 9 depicts a network apparatus 900 that may be used for precoding wireless communications, according to embodiments of the disclosure. In one embodiment, network apparatus 900 may be one implementation of a RAN node, such as the base unit 121, the RAN node 210, or gNB, described above. Furthermore, the base network apparatus 900 may include a processor 905, a memory 910, an input device 915, an output device 920, and a transceiver 925.

In some embodiments, the input device 915 and the output device 920 are combined into a single device, such as a touchscreen. In certain embodiments, the network apparatus 900 may not include any input device 915 and/or output device 920. In various embodiments, the network apparatus 900 may include one or more of: the processor 905, the memory 910, and the transceiver 925, and may not include the input device 915 and/or the output device 920.

As depicted, the transceiver 925 includes at least one transmitter 930 and at least one receiver 935. Here, the transceiver 925 communicates with one or more remote units 105. Additionally, the transceiver 925 may support at least one network interface 940 and/or application interface 945. The application interface(s) 945 may support one or more APIs. The network interface(s) 940 may support 3GPP reference points, such as Uu, N1, N2 and N3. Other network interfaces 940 may be supported, as understood by one of ordinary skill in the art.

The processor 905, in one embodiment, may include any known controller capable of executing computer-readable instructions and/or capable of performing logical operations. For example, the processor 905 may be a microcontroller, a microprocessor, a CPU, a GPU, an auxiliary processing unit, a FPGA, or similar programmable controller. In some embodiments, the processor 905 executes instructions stored in the memory 910 to perform the methods and routines described herein. The processor 905 is communicatively coupled to the memory 910, the input device 915, the output device 920, and the transceiver 925. In certain embodiments, the processor 905 may include an application processor (also known as "main processor") which manages application-domain and operating system ("OS") functions and a baseband processor (also known as "baseband radio processor") which manages radio function.

In various embodiments, the network apparatus 900 is a RAN node (e.g., gNB) that includes a processor 905 and a transceiver 925. In one embodiment, the transceiver 925 receives an indication of a determined transform precoder from a transmitter node and a set of available physical transmission resources, the physical transmission resources comprising a set of source information symbols that are redundantly combined using the determined transform precoder. In one embodiment, the processor 905 uses the determined transform precoder and the set of available physical transmission resources for transmissions between the receiver node and the transmitter node.

The memory 910, in one embodiment, is a computer readable storage medium. In some embodiments, the memory 910 includes volatile computer storage media. For example, the memory 910 may include a RAM, including dynamic RAM ("DRAM"), synchronous dynamic RAM ("SDRAM"), and/or static RAM ("SRAM"). In some embodiments, the memory 910 includes non-volatile computer storage media. For example, the memory 910 may include a hard disk drive, a flash memory, or any other suitable non-volatile computer storage device. In some embodiments, the memory 910 includes both volatile and non-volatile computer storage media.

In some embodiments, the memory 910 stores data related to precoding wireless communications. For example, the memory 910 may store parameters, configurations, resource assignments, policies, and the like, as described above. In certain embodiments, the memory 910 also stores program code and related data, such as an operating system or other controller algorithms operating on the network apparatus 900.

The input device 915, in one embodiment, may include any known computer input device including a touch panel, a button, a keyboard, a stylus, a microphone, or the like. In some embodiments, the input device 915 may be integrated with the output device 920, for example, as a touchscreen or similar touch-sensitive display. In some embodiments, the input device 915 includes a touchscreen such that text may be input using a virtual keyboard displayed on the touchscreen and/or by handwriting on the touchscreen. In some embodiments, the input device 915 includes two or more different devices, such as a keyboard and a touch panel.

The output device 920, in one embodiment, is designed to output visual, audible, and/or haptic signals. In some embodiments, the output device 920 includes an electronically controllable display or display device capable of outputting visual data to a user. For example, the output device 920 may include, but is not limited to, an LCD display, an LED display, an OLED display, a projector, or similar display device capable of outputting images, text, or the like to a user. As another, non-limiting, example, the output device 920 may include a wearable display separate from, but communicatively coupled to, the rest of the network apparatus 900, such as a smart watch, smart glasses, a heads-up display, or the like. Further, the output device 920 may be a component of a smart phone, a personal digital assistant, a television, a table computer, a notebook (laptop) computer, a personal computer, a vehicle dashboard, or the like.

In certain embodiments, the output device 920 includes one or more speakers for producing sound. For example, the output device 920 may produce an audible alert or notification (e.g., a beep or chime). In some embodiments, the output device 920 includes one or more haptic devices for producing vibrations, motion, or other haptic feedback. In some embodiments, all, or portions of the output device 920 may be integrated with the input device 915. For example, the input device 915 and output device 920 may form a touchscreen or similar touch-sensitive display. In other embodiments, the output device 920 may be located near the input device 915.

The transceiver 925 includes at least transmitter 930 and at least one receiver 935. One or more transmitters 930 may be used to communicate with the UE, as described herein. Similarly, one or more receivers 935 may be used to communicate with network functions in the non-public network ("NPN"), PLMN and/or RAN, as described herein. Although only one transmitter 930 and one receiver 935 are illustrated, the network apparatus 900 may have any suitable number of transmitters 930 and receivers 935. Further, the transmitter(s) 930 and the receiver(s) 935 may be any suitable type of transmitters and receivers.

Figure 10:
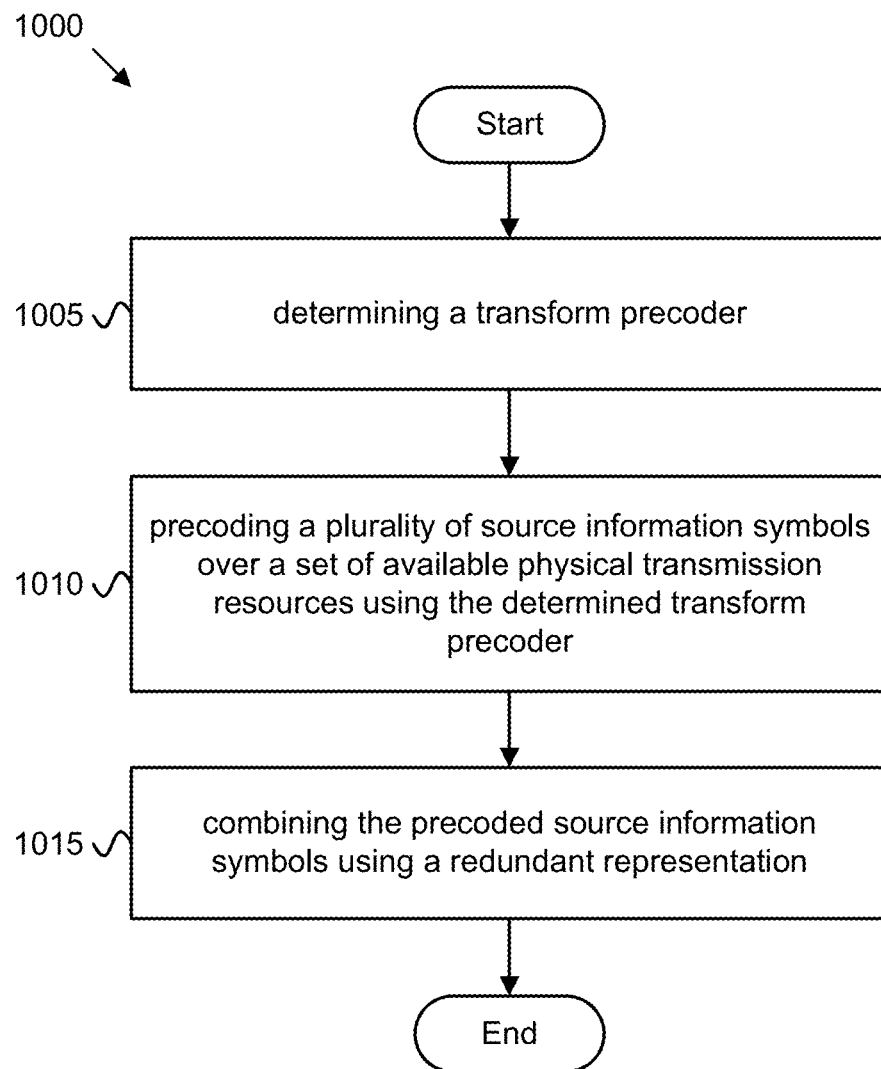
FIG. 10 is a flowchart diagram illustrating one embodiment of a method for precoding wireless communications.

FIG. 10 is a flowchart diagram of a method 1000 for precoding wireless communications. The method 1000 may be performed by a transmitter node such as a UE as described herein, for example, the remote unit 105, the UE and/or the user equipment apparatus 800 and/or a network entity such as a base node, a gNB, and/or the network equipment apparatus 900. In some embodiments, the method 1000 may be performed by a processor executing program code, for example, a microcontroller, a microprocessor, a CPU, a GPU, an auxiliary processing unit, a FPGA, or the like.

In one embodiment, the method 1000 includes determining 1005 a transform precoder. In one embodiment, the method 1000 includes precoding 1010 a plurality of source information symbols over a set of available physical transmission resources using the determined transform precoder. In one embodiment, the method 1000 includes combining 1015 the precoded source information symbols using a redundant representation, and the method 1000 ends.

Figure 11:
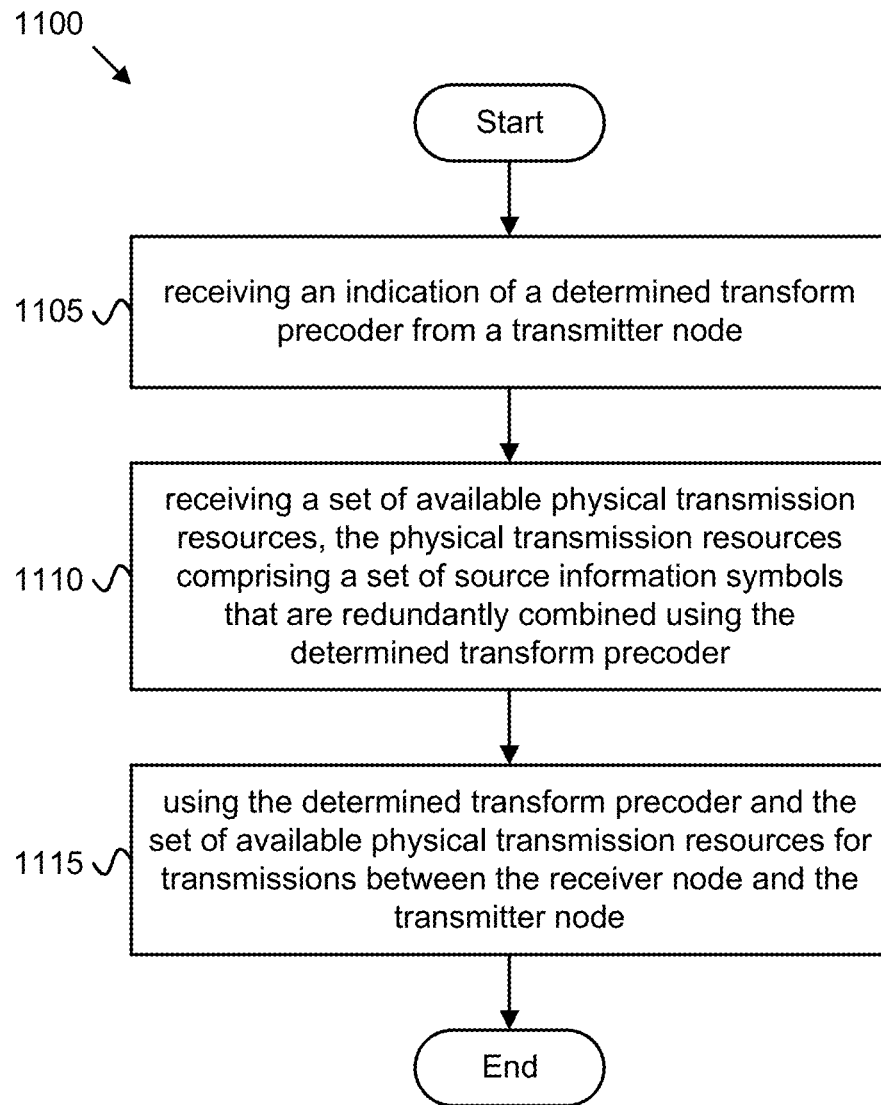
FIG. 11 is a flowchart diagram illustrating one embodiment of another method for precoding wireless communications.

FIG. 11 is a flowchart diagram of a method 1100 for precoding wireless communications. The method 1100 may be performed by a receiver node such as a UE as described herein, for example, the remote unit 105, the UE and/or the user equipment apparatus 800 and/or a network entity such as a base node, a gNB, and/or the network equipment apparatus 900. In some embodiments, the method 1100 may be performed by a processor executing program code, for example, a microcontroller, a microprocessor, a CPU, a GPU, an auxiliary processing unit, a FPGA, or the like.

In one embodiment, the method 1100 includes receiving 1105 an indication of a determined transform precoder from a transmitter node. In one embodiment, the method 1100 includes receiving 1110 a set of available physical transmission resources, the physical transmission resources comprising a set of source information symbols that are redundantly combined using the determined transform precoder. In one embodiment, the method 1100 includes using 1115 the determined transform precoder and the set of available physical transmission resources for transmissions between the receiver node and the transmitter node, and the method 1100 ends.

A first apparatus is disclosed for precoding wireless communications. The first apparatus may include a transmitter node such as a UE as described herein, for example, the remote unit 105, the UE and/or the user equipment apparatus 800 and/or a network entity such as a base node, a gNB, and/or the network equipment apparatus 900. In some embodiments, the first apparatus may include a processor executing program code, for example, a microcontroller, a microprocessor, a CPU, a GPU, an auxiliary processing unit, a FPGA, or the like.

In one embodiment, the first apparatus includes a processor that determines a transform precoder. In one embodiment, the processor precodes a plurality of source information symbols over a set of available physical transmission resources using the determined transform precoder. In one embodiment, the processor combines the precoded source information symbols using a redundant representation.

In one embodiment, the determined transform precoder comprises a spherical codebook S(M, N, t) of size N with codewords designed on the surface of an M-sized hypersphere at an angular minimum distance among codewords of acos (t).

In one embodiment, the processor optimizes the determined transform precoder to provide uniform redundancy across M dimensions defining an input space for the determined transform precoder. In one embodiment, the determined transform precoder is configured to protect and recover up to a specified number of erasures. In one embodiment, an upper bound of the specified number of erasures is defined by $$\frac{\sqrt{M(N-1)(N-M)}}{N} + 1.$$

In one embodiment, the spherical codebook S(M, N, t) comprises codewords that are harmonics formed of complex-valued N-th roots of unity. In one embodiment, the determined transform precoder is based on at least one of an N−M truncated DFT and an FFT.

In one embodiment, the set of available physical transmission resources comprises a set of available $F_{sc}$ physical information carrier resources associated with a multi-carrier modulation and multiplexing technique for transmitting information using the determined transform precoder.

In one embodiment, the processor codes and maps the plurality of source information symbols to the set of available physical information carrier resources $F_{sc}$ with $M < N \leq F_{sc}$ using the determined transform precoder. In one embodiment, the precoded N information symbols of the determined precoder provide an additional N−M redundant representation of the source information symbols, the redundant representation being used at a receiver node to recover potential lost source information symbols due to media transmission impairments between the transmitter node and the receiver node.

In one embodiment, the processor transmits one or more of the following data elements to the receiver node over the one of the control reference signal and the data reference signal: a turn-on/off activation bit field, a field representing the M-dimensionality of the determined transform precoder selected as an integer of a maximum bit width $\lceil \log_2(M) \rceil$, a field representing the N-dimensionality of the determined transform precoder selected as an integer of a maximum bit width $\lceil \log_2(N) \rceil$, and a mapping of the redundant precoded N symbols to the available $F_{sc}$ physical resources.

In one embodiment, the transmitted data elements are indexed based on a common reference table shared between the transmitter node and the receiver node. In one embodiment, the processor maps the redundantly precoded N symbols one of contiguously, over a channel band up to $F_{sc}$ available physical information carrier resource elements and non-contiguously, across distinct channel bands up to $F_{sc}$ physical information carrier resources.

In one embodiment, the processor optimizes the determined transform precoder to provide selective redundancy across M dimensions defining an input space for the determined transform precoder based on at least one of an available CSI profile at the transmitter node, a desired UEP redundant representation of the source information symbols, and an improvement in radio frequency transmission characteristics between the transmitter node and the receiver node, comprising at least one of PAPR and EVM given a predetermined MCS configuration.

A first method is disclosed for precoding wireless communications. The first method may be performed by a transmitter node such as a UE as described herein, for example, the remote unit 105, the UE and/or the user equipment apparatus 900 and/or a network entity such as a base node, a gNB, and/or the network equipment apparatus 1000. In some embodiments, the first method may be performed by a processor executing program code, for example, a microcontroller, a microprocessor, a CPU, a GPU, an auxiliary processing unit, a FPGA, or the like.

In one embodiment, the first method includes determining a transform precoder. In one embodiment, the first method includes precoding a plurality of source information symbols over a set of available physical transmission resources using the determined transform precoder. In one embodiment, the first method includes combining the precoded source information symbols using a redundant representation.

In one embodiment, the determined transform precoder comprises a spherical codebook S(M, N, t) of size N with codewords designed on the surface of an M-sized hypersphere at an angular minimum distance among codewords of acos (t).

In one embodiment, the first method includes optimizing the determined transform precoder to provide uniform redundancy across M dimensions defining an input space for the determined transform precoder. In one embodiment, the determined transform precoder is configured to protect and recover up to a specified number of erasures. In one embodiment, an upper bound of the specified number of erasures is defined by $$\frac{\sqrt{M(N-1)(N-M)}}{N} + 1.$$

In one embodiment, the spherical codebook S(M, N, t) comprises codewords that are harmonics formed of complex-valued N-th roots of unity. In one embodiment, the determined transform precoder is based on at least one of an N–M truncated DFT and an FFT.

In one embodiment, the set of available physical transmission resources comprises a set of available $F_{sc}$ physical information carrier resources associated with a multi-carrier modulation and multiplexing technique for transmitting information using the determined transform precoder.

In one embodiment, the first method includes coding and mapping the plurality of source information symbols to the set of available physical information carrier resources $F_{sc}$ with M<N≤$F_{sc}$ using the determined transform precoder. In one embodiment, the precoded N information symbols of the determined precoder provide an additional N–M redundant representation of the source information symbols, the redundant representation being used at a receiver node to recover potential lost source information symbols due to media transmission impairments between the transmitter node and the receiver node.

In one embodiment, the first method includes transmitting one or more of the following data elements to the receiver node over the one of the control reference signal and the data reference signal: a turn-on/off activation bit field, a field representing the M-dimensionality of the determined transform precoder selected as an integer of a maximum bit width $\lceil \log_2(M) \rceil$, a field representing the N-dimensionality of the determined transform precoder selected as an integer of a maximum bit width $\lceil \log_2(N) \rceil$, and a mapping of the redundant precoded N symbols to the available $F_{sc}$ physical resources.

In one embodiment, the transmitted data elements are indexed based on a common reference table shared between the transmitter node and the receiver node. In one embodiment, the first method includes mapping the redundantly precoded N symbols one of contiguously, over a channel band up to $F_{sc}$ available physical information carrier resource elements and non-contiguously, across distinct channel bands up to $F_{sc}$ physical information carrier resources.

In one embodiment, the first method includes optimizing the determined transform precoder to provide selective redundancy across M dimensions defining an input space for the determined transform precoder based on at least one of an available CSI profile at the transmitter node, a desired UEP redundant representation of the source information symbols, and an improvement in radio frequency transmission characteristics between the transmitter node and the receiver node, comprising at least one of PAPR and EVM given a predetermined MCS configuration.

A second apparatus is disclosed for precoding wireless communications. The second apparatus may include a receiver node such as a UE as described herein, for example, the remote unit 105, the UE and/or the user equipment apparatus 900 and/or a network entity such as a base node, a gNB, and/or the network equipment apparatus 1000. In some embodiments, the second apparatus may include a processor executing program code, for example, a microcontroller, a microprocessor, a CPU, a GPU, an auxiliary processing unit, a FPGA, or the like.

In one embodiment, the second apparatus includes a transceiver that receives an indication of a determined transform precoder from a transmitter node and a set of available physical transmission resources, the physical transmission resources comprising a set of source information symbols that are redundantly combined using the determined transform precoder. In one embodiment, the second apparatus includes a processor that uses the determined transform precoder and the set of available physical transmission resources for transmissions between the receiver node and the transmitter node.

A second method is disclosed for precoding wireless communications. The second method may be performed by a receiver node such as a UE as described herein, for example, the remote unit 105, the UE and/or the user equipment apparatus 900 and/or a network entity such as a base node, a gNB, and/or the network equipment apparatus 1000. In some embodiments, the second method may be performed by a processor executing program code, for example, a microcontroller, a microprocessor, a CPU, a GPU, an auxiliary processing unit, a FPGA, or the like.

In one embodiment, the second method includes receiving an indication of a determined transform precoder from a transmitter node and a set of available physical transmission resources, the physical transmission resources comprising a set of source information symbols that are redundantly combined using the determined transform precoder. In one embodiment, the second method includes using the determined transform precoder and the set of available physical transmission resources for transmissions between the receiver node and the transmitter node.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus, comprising:
a processor; and
a memory coupled with the processor, the memory comprising instructions executable by the processor to cause the apparatus to:
precode a set of symbols over a set of resources using a transform precoder that constrains a search space of codewords to a unit hypersphere such that the transform precoder comprises a spherical codebook having an angular threshold distance between codewords; and
combine the precoded set of symbols in a redundant manner such that multiple parts of the precoded set of symbols are used to protect against loss of the set of symbols.

2. The apparatus of claim 1, wherein the instructions are further executable by the processor to cause the apparatus to optimize the transform precoder to provide uniform redundancy across M dimensions defining an input space for the transform precoder.

3. The apparatus of claim 2, wherein the transform precoder is configured to protect and recover up to a specified number of erasures.

4. The apparatus of claim 3, wherein an upper bound of the specified number of erasures is defined by $$\frac{\sqrt{M(N-1)(N-M)}}{N}+1,$$

where N is an output space dimension of the transform precoder.

5. The apparatus of claim 1, wherein the spherical codebook comprises codewords that are harmonics formed of complex-valued N-th roots of unity.

6. The apparatus of claim 5, wherein the transform precoder is based on at least one of an N−M truncated discrete Fourier transform ("DFT") and a Fast Fourier Transform ("FFT").

7. The apparatus of claim 1, wherein the instructions are further executable by the processor to cause the apparatus to precode the set of symbols over a set of available physical transmission resources, the set of available physical transmission resources comprising a set of available $F_{sc}$ physical information carrier resources associated with a multi-carrier modulation and multiplexing technique for transmitting information using the transform precoder.

8. The apparatus of claim 7, wherein the set of available physical transmission resources comprises a set of spatial layers corresponding to a multiple-input multiple-output ("MIMO") spatial multiplexing technique for transmitting information using the transform precoder.

9. The apparatus of claim 7, wherein the instructions are further executable by the processor to cause the apparatus to code and map the set of symbols to the set of available physical information carrier resources $F_{sc}$ with $M<N\leq F_{sc}$ using the transform precoder.

10. The apparatus of claim 9, wherein the precoded set of symbols provide an additional N−M redundant representation of the set of symbols, the redundant representation being used at a receiver node to recover potential lost source information symbols due to media transmission impairments between a transmitter node and the receiver node.

11. The apparatus of claim 10, wherein the instructions are further executable by the processor to cause the apparatus to transmit a configuration for the transform precoder to the receiver node over one of a control reference signal and a data reference signal.

12. The apparatus of claim 11, wherein the instructions are further executable by the processor to cause the apparatus to transmit one or more of the following data elements to the receiver node over the one of the control reference signal and the data reference signal:
a turn-on/off activation bit field;
a field representing N−M truncated harmonics of an N-point discrete Fourier transform ("DFT") as a base codebook for the transform precoder;
a field representing the M-dimensionality of the transform precoder selected as an integer of a maximum bit width $\lceil \log_2(M) \rceil$;
a field representing the N-dimensionality of the transform precoder selected as an integer of a maximum bit width $\lceil \log_2(N) \rceil$; and
a mapping of the redundant precoded N symbols to the available $F_{sc}$ physical resources.

13. The apparatus of claim 12, wherein the instructions are further executable by the processor to cause the apparatus to map the redundantly precoded symbols one of:
contiguously, over a channel band up to $F_{sc}$ available physical information carrier resource elements; and
non-contiguously, across distinct channel bands up to $F_{sc}$ physical information carrier resources.

14. The apparatus of claim 13, wherein the mapping of the redundantly precoded symbols to the $F_{sc}$ available physical information carrier resources is signaled to the receiver node by at least one of:
a demodulation reference signal ("DM-RS") indication;
a downlink control information ("DCI") indication;
an uplink control information ("UCI") indication; and
a sidelink control information ("SCI") indication.

15. The apparatus of claim 12, wherein the transmitted data elements are indexed based on a common reference table shared between the transmitter node and the receiver node.

16. The apparatus of claim 11, wherein the instructions are further executable by the processor to cause the apparatus to transmit the configuration for the transform precoder to the receiver node over at least one of:

a downlink control information ("DCI") indication;
an uplink control information ("UCI") indication; and
a sidelink control information ("SCI") indication.

17. The apparatus of claim 11, wherein the configuration for the transform precoder applied to a set of spatial layers of a multiple-input multiple-output ("MIMO") spatial multiplexing transmission is at least one of:
    common-layer, applicable to each layer of the set of spatial layers; and
    layer-based, distinct for each layer of the set of spatial layers.

18. The apparatus of claim 1, wherein the instructions are further executable by the processor to cause the apparatus to optimize the transform precoder to provide selective redundancy across M dimensions defining an input space for the transform precoder based on at least one of:
    an available channel state information ("CSI") profile at a transmitter node;
    a desired unequal error protection ("UEP") redundant representation of the symbols; and
    an improvement in radio frequency transmission characteristics between a transmitter node and a receiver node, comprising at least one of peak-to-average power ratio ("PAPR") and error vector magnitude ("EVM") given a predetermined coding and modulation ("MCS") configuration.

19. A method, comprising:
    precoding a set of symbols over a set of resources using a transform precoder that constrains a search space of codewords to a unit hypersphere such that the transform precoder comprises a spherical codebook having an angular threshold distance between codewords; and
    combining the precoded set of symbols in a redundant manner such that multiple parts of the precoded set of symbols are used to protect against loss of the set of symbols.

20. An apparatus, comprising:
a processor; and
a memory coupled with the processor, the memory comprising instructions executable by the processor to cause the apparatus to:
    receive an indication of a transform precoder, the transform precoder precoding a set of symbols over a set of resources by a search space of codewords constrained to a unit hypersphere such that the transform precoder comprises a spherical codebook having an angular threshold distance between codewords;
    receive a set of available physical transmission resources, the physical transmission resources comprising a set of symbols that are combined using the transform precoder in a redundant manner such that multiple parts of the precoded set of symbols are used to protect against loss of the set of symbols; and
    use the transform precoder and the set of available physical transmission resources for transmissions between a receiver node and a transmitter node.

* * * * *